US012066650B2

(12) United States Patent
Acharya et al.

(10) Patent No.: US 12,066,650 B2
(45) Date of Patent: Aug. 20, 2024

(54) AZIMUTHALLY ANISOTROPIC POLARIZATION SENSITIVE OPTICAL FILTER

(71) Applicant: 3M INNOVATIVE PROPERTIES COMPANY, St. Paul, MN (US)

(72) Inventors: Bharat R. Acharya, Woodbury, MN (US); John A. Wheatley, Stillwater, MN (US); Andrew J. Carlson, Eagan, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/319,701

(22) Filed: May 18, 2023

(65) Prior Publication Data

US 2023/0384507 A1 Nov. 30, 2023

Related U.S. Application Data

(60) Provisional application No. 63/345,110, filed on May 24, 2022.

(51) Int. Cl.
*F21V 8/00* (2006.01)

(52) U.S. Cl.
CPC ......... *G02B 6/0056* (2013.01); *G02B 6/0026* (2013.01); *G02B 6/0053* (2013.01)

(58) Field of Classification Search
CPC ... G02B 6/0056; G02B 6/0026; G02B 6/0053
See application file for complete search history.

(56) References Cited

U.S. PATENT DOCUMENTS

| | | | |
|---|---|---|---|
| 6,208,466 B1* | 3/2001 | Liu | G02B 5/0252 359/590 |
| 2019/0293486 A1 | 9/2019 | Wheatley et al. | |
| 2021/0033899 A1* | 2/2021 | Chang | G02B 6/0053 |

* cited by examiner

*Primary Examiner* — Donald L Raleigh
(74) *Attorney, Agent, or Firm* — Jonathan L. Tolstedt

(57) ABSTRACT

An optical construction includes an optical film between first and second prismatic films, which each include pluralities of parallel, linear first and second prisms. Each of the first and second prisms have opposing first and second sides extending from first and second ends of a base of the prism and meeting at a peak. The first and second sides make first and second base angles with the base of the prism. The peaks of the prismatic films face away from each other and the optical film. For a collimated, normally incident light, for at least a first wavelength in a first wavelength range, and for each of first and second polarization states: the optical film has an optical transmission of less than about 1%, and the optical construction transmits at least 1% of the incident light at an oblique angle greater than 5 degrees with respect to the optical film.

7 Claims, 16 Drawing Sheets

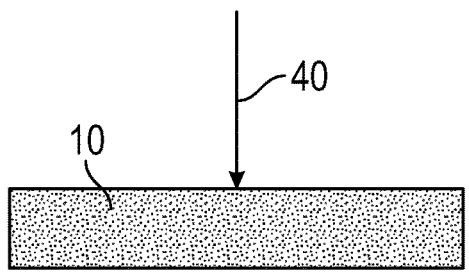
FIG. 2A
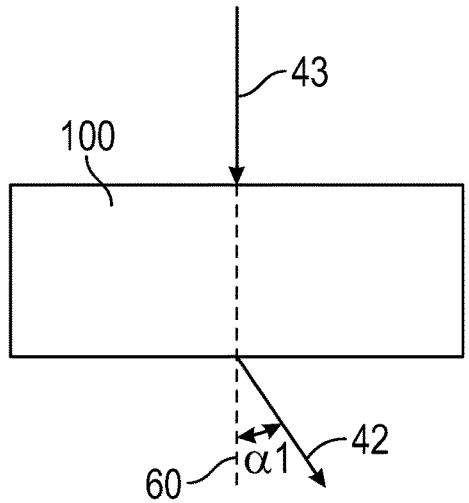
FIG. 2B
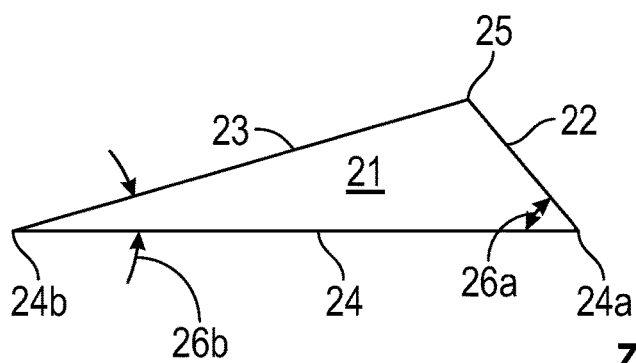
FIG. 2C
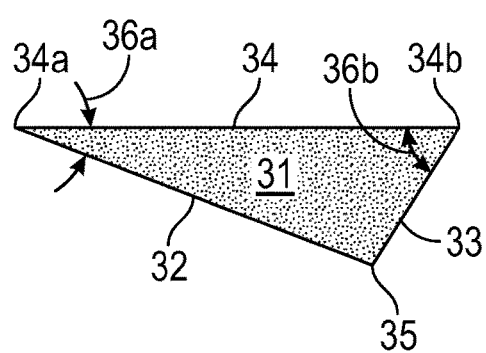
FIG. 2D
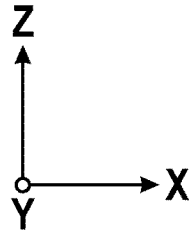

| | OF(p,0) | OF(p,10) | OF(p,20) | OF(p,30) | OF(p,40) | OF(p,50) | OF(p,60) |
|---|---|---|---|---|---|---|---|
| 420-680 nm: | 0.21 | 0.19 | 0.16 | 0.13 | 0.10 | 0.12 | 0.11 |
| 850-1200 nm: | 13.27 | 16.52 | 21.93 | 30.88 | 44.98 | 60.18 | 73.71 |
| 420-1000 nm: | 0.28 | 0.31 | 0.31 | 0.34 | 0.94 | 4.83 | 12.14 |
| 700 nm: | 0.02 | 0.03 | 0.02 | 0.10 | 0.47 | 0.13 | 0.00 |
| 800 nm: | 0.53 | 0.45 | 0.11 | -0.05 | -0.01 | 0.26 | 0.12 |
| 900 nm: | 0.13 | 0.27 | 0.38 | 0.49 | 1.51 | 1.36 | 13.79 |

| | OF(s,0) | OF(s,10) | OF(s,20) | OF(s,30) | OF(s,40) | OF(s,50) | OF(s,60) |
|---|---|---|---|---|---|---|---|
| 420-680 nm: | 0.26 | 0.21 | 0.13 | 0.06 | 0.03 | 0.02 | 0.01 |
| 850-1200 nm: | 14.54 | 16.42 | 20.70 | 26.41 | 32.16 | 37.02 | 36.65 |
| 420-1000 nm: | 0.35 | 0.32 | 0.24 | 0.16 | 0.22 | 0.94 | 2.48 |
| 700 nm: | 0.02 | 0.05 | 0.02 | 0.08 | 0.13 | 0.04 | 0.02 |
| 800 nm: | 0.58 | 0.77 | 0.04 | -0.09 | -0.06 | 0.04 | -0.06 |
| 900 nm: | 0.05 | 0.21 | 0.24 | 0.17 | 0.15 | 0.16 | 1.01 |

FIG. 4A

| 1000 nm: | OF(p,0) | OF(p,10) | OF(p,20) | OF(p,30) | OF(p,40) | OF(p,50) | OF(p,60) |
|---|---|---|---|---|---|---|---|
| | 0.92 | 2.88 | 0.99 | 1.62 | 14.34 | 74.33 | 89.23 |

58

| 1000 nm: | OF(s,0) | OF(s,10) | OF(s,20) | OF(s,30) | OF(s,40) | OF(s,50) | OF(s,60) |
|---|---|---|---|---|---|---|---|
| | 1.25 | 3.53 | 0.74 | 0.65 | 2.81 | 15.53 | 72.81 |

| | Tp(0,-60) | Tp(0,-50) | Tp(0,-40) | Tp(0,-30) | Tp(0,-20) | Tp(0,-10) | Tp(0,0) | Tp(0,10) | Tp(0,20) | Tp(0,30) | Tp(0,40) | Tp(0,50) | Tp(0,60) |
|---|---|---|---|---|---|---|---|---|---|---|---|---|---|
| 420-1000 nm: | 5.14 | 2.11 | 0.92 | 2.64 | 5.08 | 1.38 | 0.98 | 0.52 | 0.30 | 0.46 | 1.47 | 0.66 | 0.17 |
| 700 nm: | 4.81 | 2.27 | 0.75 | 0.43 | 0.07 | 0.12 | 0.33 | 0.23 | 0.12 | 0.27 | 0.16 | 0.00 | 0.06 |
| 800 nm: | 7.09 | 2.48 | 1.24 | 5.53 | 9.96 | 0.87 | 0.48 | 0.30 | 0.12 | 0.34 | 0.51 | 0.03 | 0.00 |
| 900 nm: | 6.93 | 2.52 | 1.63 | 6.38 | 13.45 | 3.92 | 2.79 | 1.20 | 0.52 | 0.76 | 4.11 | 2.15 | 0.58 |

| | Ts(0,-60) | Ts(0,-50) | Ts(0,-40) | Ts(0,-30) | Ts(0,-20) | Ts(0,-10) | Ts(0,0) | Ts(0,10) | Ts(0,20) | Ts(0,30) | Ts(0,40) | Ts(0,50) | Ts(0,60) |
|---|---|---|---|---|---|---|---|---|---|---|---|---|---|
| 420-1000 nm: | 2.84 | 1.89 | 0.80 | 1.76 | 3.00 | 0.92 | 0.90 | 0.51 | 0.27 | 0.32 | 0.70 | 0.53 | 0.31 |
| 700 nm: | 2.78 | 2.12 | 0.37 | 0.16 | 0.07 | 0.06 | 0.08 | 0.02 | 0.19 | 0.16 | 0.17 | 0.00 | 0.00 |
| 800 nm: | 3.31 | 2.64 | 1.26 | 1.75 | 2.19 | 0.54 | 0.46 | 0.53 | 0.57 | 0.42 | 0.41 | 0.40 | 0.37 |
| 900 nm: | 4.94 | 2.65 | 1.72 | 5.55 | 10.29 | 2.45 | 2.62 | 1.36 | 0.52 | 0.54 | 1.23 | 1.29 | 1.01 |

FIG. 6

AZIMUTHALLY ANISOTROPIC POLARIZATION SENSITIVE OPTICAL FILTER

SUMMARY

In some aspects of the present description, an optical construction is provided, the optical construction including an optical film disposed between, and bonded to, first and second prismatic films. The first and second prismatic films include corresponding pluralities of substantially parallel substantially linear first and second prisms extending along a same first direction. Each of the first and second prisms include opposing first and second sides extending from opposite corresponding first and second ends of a base of the prism and meeting at a peak of the prism. The first and second sides make respective first and second base angles with the base of the prism. The prism peaks of the first and second prismatic films face away from each other and the optical film. For a substantially collimated, substantially normally incident light, for at least a first wavelength in a first wavelength range extending from about 420 nm to about 1200 nm, and for each of mutually orthogonal in-plane first and second polarization states, the optical film has an optical transmission of less than about 1%, and the optical construction transmits at least 1% of the incident light as a first transmitted light propagating at an oblique angle of greater than about degrees with respect to a normal to the optical film.

In some aspects of the present description, an optical construction is provided, the optical construction including an optical film disposed between, and bonded to, first and second structured films. The first and second structured films include respective pluralities of regularly arranged first and second structures having respective pluralities of first and second peaks facing away from each other and the optical film. For a substantially collimated, substantially normally incident light beam propagating in an incident plane that is orthogonal to the optical film and defines a bisecting plane that includes the incident light beam and is orthogonal to the incident plane, and for at least a first wavelength in a first wavelength range extending from about 420 nm to about 1200 nm, the optical construction has optical transmissions T1 and T1' along respective first and second transmission directions that are in the incident plane and on a same first side of the bisecting plane, and make different respective first and second angles with the bisecting plane, and optical transmissions T2 and T2' along respective third and fourth transmission directions that are in the incident plane and on a same second, opposite the first, side of the bisecting plane, and make the respective first and second angles with the bisecting plane, such that T1>T2 and T2'>T1'. For a substantially normally incident light having the at least the first wavelength, the optical film has an optical reflectance of greater than about 80% for each of an in-plane first polarization state parallel to the incident plane and an orthogonal second polarization state parallel to the bisecting plane.

In some aspects of the present description, an optical construction is provided, the optical construction including an optical film disposed between, and bonded to, first and second structured films. The first and second structured films include respective pluralities of regularly arranged first and second structures having respective pluralities of first and second peaks facing away from each other and the optical film. For a substantially collimated, substantially normally incident light beam propagating in an incident plane that is orthogonal to the optical film and defines a bisecting plane that includes the incident light beam and is orthogonal to the incident plane, and for at least first and second wavelengths that are at least 50 nm apart and disposed in a first wavelength range extending from about 420 nm to about 1200 nm, the optical construction has respective optical transmissions T1 and T1' along a first transmission direction that is on a first side of the bisecting plane and makes a first angle with the bisecting plane, and optical transmissions T2 and T2' along a second transmission direction that is on an opposite second side of the bisecting plane and makes the first angle with the bisecting plane, such that T1>T2 and T2'>T1'. For a substantially normally incident light having the at least the first wavelength, the optical film has an optical reflectance of greater than about 80% for each of an in-plane first polarization state parallel to the incident plane and an in-plane, orthogonal second polarization state parallel to the bisecting plane.

In some aspects of the present description, an optical construction is provided, the optical construction including an optical film disposed between, and bonded to, first and second structured films. The first and second structured films include respective pluralities of regularly arranged first and second structures having respective pluralities of first and second peaks facing away from each other and the optical film. For a substantially collimated, substantially normally incident light beam propagating in an incident plane that is orthogonal to the optical film and defines a bisecting plane that includes the incident light beam and is orthogonal to the incident plane, and for each wavelength in a first wavelength range extending from about 500 nm to about 1000 nm, the optical construction has an optical transmission T1 along a first transmission direction that is on a first side of the bisecting plane and makes a first angle with the bisecting plane, and an optical transmissions T2 along a second transmission direction that is on an opposite second side of the bisecting plane and makes the first angle with the bisecting plane, such that T1 greater than T2 by at least 1%. For a substantially normally incident light having the at least the first wavelength, the optical film has an optical reflectance of greater than about 80% for each of an in-plane first polarization state parallel to the incident plane and an in-plane orthogonal second polarization state parallel to the bisecting plane.

In some aspects of the present description, an optical construction is provided, the optical construction including an optical film disposed between, and bonded to, first and second structured films. The first and second structured films include respective pluralities of regularly arranged first and second structures having respective pluralities of first and second peaks facing away from each other and the optical film. For a substantially collimated, substantially normally incident light beam propagating in an incident plane that is orthogonal to the optical film and defines a bisecting plane that includes the incident light beam and is orthogonal to the incident plane, and for each of at least a first wavelength in a visible wavelength range extending from about 420 nm to about 680 nm and a second wavelength in an infrared wavelength range extending from about 700 nm to about 1200 nm, and for orthogonal first and second polarization states, the optical construction has respective optical transmissions T1 and T2, such that T1>T2. For a substantially normally incident light having the at least the first wavelength, the optical film has an optical reflectance of greater than about 80% for each of the first and second polarization states.

In some aspects of the present description, an optical construction is provided, the optical construction including an optical film disposed between, and bonded to, first and second structured films. The first and second structured films include respective pluralities of regularly arranged first and second structures having respective pluralities of first and second peaks facing away from each other and the optical film. For a substantially collimated, substantially normally incident light beam propagating in an incident plane that is orthogonal to the optical film and defines a bisecting plane that includes the incident light beam and is orthogonal to the incident plane, and for at least a first wavelength in a first wavelength range extending from about 420 nm to about 1200 nm, and for orthogonal first and second polarization states, the optical construction has respective optical transmissions T1 and T2 along a same first transmission direction that is on a first side of the bisecting plane and makes a first angle with the bisecting plane; and optical transmissions T1' and T2' along a same second transmission direction that is on an opposite second side of the bisecting plane and makes the first angle with the bisecting plane, such that T1>T2 and T2'>T1'. For a substantially normally incident light having the at least the first wavelength, the optical film has an optical reflectance of greater than about 80% for each of the first and second polarization states.

In some aspects of the present description, an optical construction is provided, the optical construction including an optical film disposed between, and bonded to, opposing major first and second structured surfaces of the optical construction. The major first and second structured surfaces include respective pluralities of substantially planar, substantially linear first and second facets. The first facets extend along a same first length direction and are arranged regularly along an orthogonal first width direction. The second facets extend along a same second length direction and are arranged regularly along an orthogonal second width direction. The first and second length directions make an angle of less than about 50 degrees with each other. For a substantially normally incident light, for at least a visible wavelength range extending from about 420 nm to about 680 nm, and for each of in-plane orthogonal first and second polarization states, the optical film has an average optical reflectance of greater than about 80%.

In some aspects of the present description, an optical construction is provided, the optical construction including an optical film disposed between, and bonded to, first and second structured films. The first and second structured films include respective pluralities of regularly arranged first and second structures having respective pluralities of first and second peaks facing away from each other and the optical film. For a substantially collimated incident light beam propagating in an incident plane and incident at an incident location on the optical construction at a first incident angle of greater than about 5 degrees and defining a bisecting plane that includes the incident location and is orthogonal to the incident plane, and for at least a first wavelength in a first wavelength range extending from about 420 nm to about 1200 nm, and for at least a first polarization state, the optical construction has respective optical transmissions S2 and S2' along a same first transmission direction that makes a first angle with the bisecting plane and is on an opposite side of the bisecting plane relative to the incident light, such that S2/S2'≥1.1.

In some aspects of the present description, an optical construction is provided, the optical construction including an optical film disposed between, and bonded to, first and second structured films. The first and second structured films comprising respective pluralities of regularly arranged first and second structures include respective pluralities of first and second peaks facing away from each other and the optical film. For a substantially collimated incident light beam propagating in an incident plane and incident at an incident location on the optical construction at a first incident angle of greater than about 5 degrees and defining a bisecting plane that includes the incident location and is orthogonal to the incident plane, and for at least a first wavelength in a first wavelength range extending from about 420 nm to about 1200 nm, and for at least a first polarization state, the optical construction has an optical transmission S1 along a first transmission direction that makes a first angle with the bisecting plane when the incident light is on a same first side of the bisecting plane as the first transmission direction, and an optical transmission S2 along the first transmission direction when the incident light is on an opposite second side of the bisecting plane as the first transmission direction, such that S2/S1≥1.5.

BRIEF DESCRIPTION OF THE DRAWINGS

FIGS. 2A-2D provide additional details on the optical construction of FIG. 1, in accordance with an embodiment of the present description;

FIGS. 4A-4B are tables summarizing the graphs of FIGS. 3A-3B, in accordance with an embodiment of the present description;

FIG. 6 is a table summarizing the graphs of FIGS. 5A-5B, in accordance with an embodiment of the present description;

DETAILED DESCRIPTION

Figure 1:
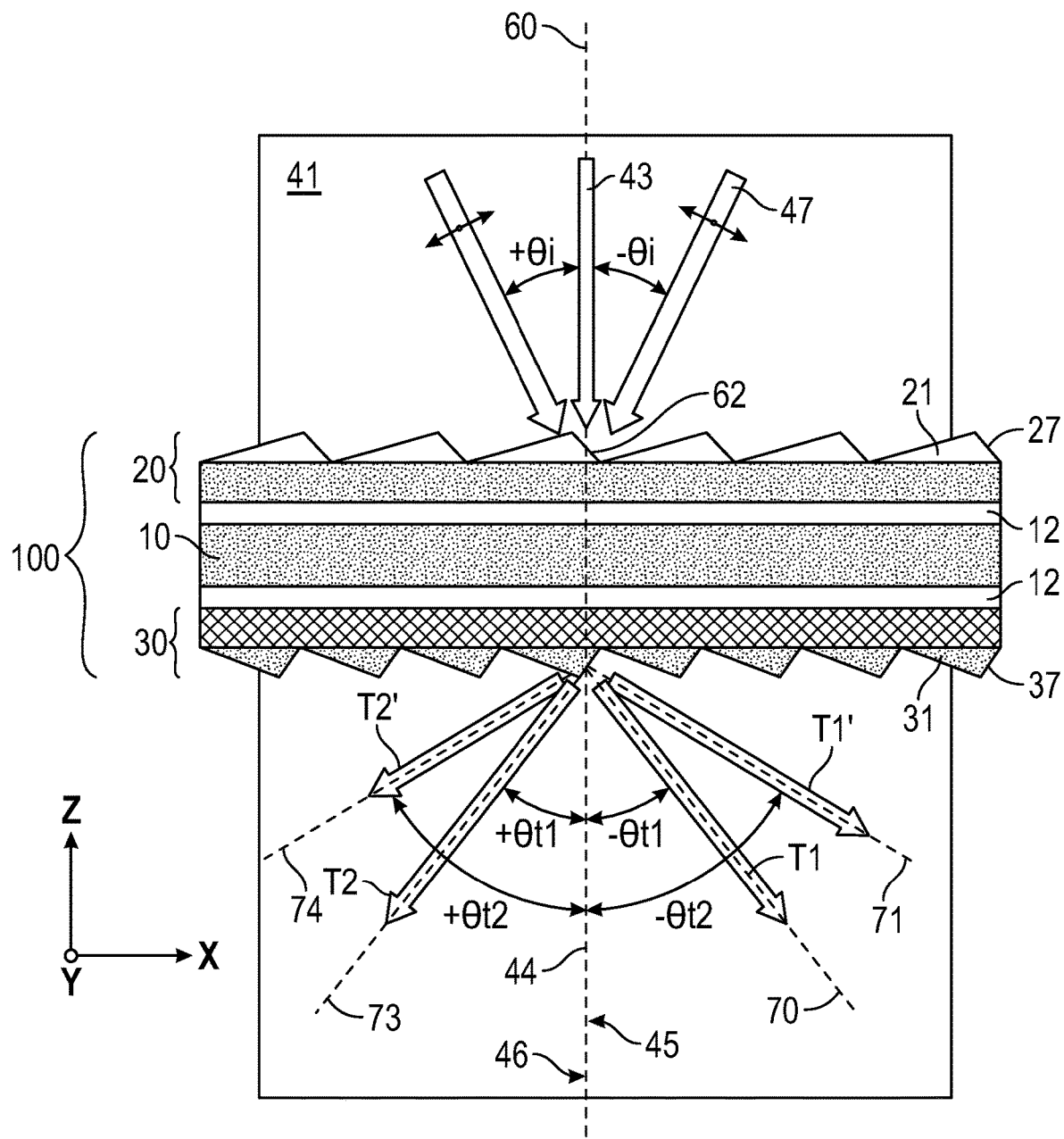
FIG. 1 is a side view of an optical construction, in accordance with an embodiment of the present description.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

The use of multilayer optical film (MOF) technology enables two fundamental aspects of light management in display systems, wavelength control (i.e., the transmission of only select wavelengths through the film) and polarization control (i.e., control of "in-plane" and "out-of-plane" optical properties of materials used in the film).

Wavelength control is typically achieved by carefully designing the layer profile of the MOF so that the band edges of the transmission spectra (i.e., the cut-off point in the spectrum where the transmission changes abruptly) are placed at desired locations. This enables manufacturing of large quantities of multilayer optical films with predictable optical properties. Since the optical properties of MOF films are based on the interference of light among multiple layers with anisotropic refractive indices, the films often exhibit angular dependence of the optical properties. That is, the optical properties of the films depend on the angle of incidence of the light on the film. For example, the right band-edge of a MOF may shift toward the lower wavelengths as the angle of incidence of the light increases (with respect to the surface normal) at a rate of about 2-3 nm/degrees. However, this rate of shift may be different for different polarization states. For many applications, this angular shift of the band edge may introduce unwanted leaks in the transmission spectra.

For example, in display applications that require perfect white balanced displays, a shift in blue wavelengths in the right band edge at higher angles of incidence, whether for one polarization state or for both, is not desired as it can change the color performance of the displays (e.g., result in unwanted color shift). Therefore, the MOF is typically designed with the band edges located deep in the infrared region such that this band shift minimizes any impact on the desired performance in the visible spectrum. However, designing an MOF film with local control over the wavelength or polarization can be difficult, as these films are typically manufactured using a continuous extrusion process, and imparting local thickness variation can be very challenging. Therefore, it is difficult to have a MOF that has local wavelength control as well as a high degree of polarization control.

Another technology for light management in display systems is the use of microreplicated structures (e.g., linear prisms) which can provide an ability to control the direction of light incident on a film. By designing micro/nano structures from a material with a precisely controlled refractive index, the light output from these microstructures (for example, direction angle) can be controlled. This micro/nano structure technology allows a display to redirect images at different physical locations within a small area. However, controlling the polarization or wavelength of light using only microstructures can be difficult.

As new applications such as biometric sensing, health monitoring, and diagnostics for light management films emerge, it is anticipated that light management films will require new functionalities such as localized light control (as opposed to uniform large area lighting in traditional display applications), the ability to deliver light with different wavelengths at different locations within a small region, and reflecting one wavelength in one direction but transmitting it in another direction.

According to some aspects of the present description, an optical construction is provided which combines these two aspects, multilayer optical films and micro/nano structure direction control, to allow independent control of the transmission and reflection of both polarization and wavelength of light at localized areas of the optical construction. The optical construction includes an optical film (i.e., a MOF) disposed between, and bonded to, first and second structured films. The first and second structured films include respective pluralities of regularly arranged first and second structures include respective pluralities of first and second peaks facing away from each other and the optical film.

By laminating the optical film between two structured films, it is possible to efficiently in-couple the incident light through the reflective film at an angle that would otherwise not be permitted by Snell's law for the construction of the optical film. This in-coupled light is extracted by the second structured film on the other side of the optical construction and can be selectively transmitted in different directions. Such an optical construction can enable enhancement of biometric sensing for smart phones, health monitoring features in consumer electronics devices, new diagnostics devices, polarized spectroscopy, and other new technologies.

According to some aspects of the present description, an optical construction includes an optical film disposed between, and bonded to, first and second prismatic films. In some embodiments, the first and second prismatic films may include corresponding pluralities of substantially parallel substantially linear first and second prisms extending along a same first direction (for example, along a y-axis of the films). In some embodiments, each of the first and second prisms may include opposing first and second sides extending from opposite corresponding first and second ends of a base of the prism and meeting at a peak of the prism (e.g., a linear prism extending across the first direction of the film, having a triangular cross section). In some embodiments, the first and second sides may make respective first and second base angles with the base of the prism. In some embodiments, the first and second base angles are different from each other by at least about 5 degrees. In some embodiments, the corresponding pluralities of substantially parallel substantially linear first and second prisms form concentric rings. In some embodiments, the prism peaks of the first and second prismatic films may face away from each other and the optical film (i.e., the first prism peaks may face "up" and the second prism peaks may face "down," where "up" and "down" are relative to a surface of the optical film).

In some embodiments, for a substantially collimated substantially normally incident light, for at least a first wavelength in a first wavelength range extending from about 420 nm to about 1200 nm, and for each of mutually orthogonal in-plane first (e.g., an x-direction relative to the surface of the film) and second (e.g., a y-direction relative to the surface of the film) polarization states, the optical film may have an optical transmission of less than about 1%, or less than about or less than about 0.08%, or less than about 0.07%, or less than about 0.06%, or less than about 0.05%, or less than about 0.04%, or less than about 0.03%, and the optical construction may transmits at least 1%, or at least 1.2%, or at least 1.4%, or at least 1.6%, or at least 1.8%, or at least 2%, or at least 2.1% of the incident light as a first transmitted light propagating at an oblique angle of greater than about 5 degrees, or greater than about 10 degrees, or greater than about 20 degrees, or greater than about 30 degrees, or greater than about 40 degrees, or greater than about 50 degrees, or greater than about 55 degrees with respect to a normal to the optical film.

In some embodiments, for light incident at an incident angle of greater than about 30 degrees, or greater than about 35 degrees, or greater than about 40 degrees, or greater than about degrees, or greater than about 50 degrees, or greater than about 55 degrees, for each of the first and second polarization states, and for the at least the first wavelength, the optical film may have an optical transmission of less than about 1%, or less than about 0.9%, or less than about 0.8%, or less than about 0.7%, or less than about 0.6%, or less than about 0.5%, or less than about 0.4%, or less than about 0.3%, or less than about 0.2%.

According to some aspects of the present description, an optical construction includes an optical film disposed between, and bonded to, first and second structured films. In some embodiments, the first and second structured films may include respective pluralities of regularly arranged first and second structures (e.g., linear prisms, or structures in concentric rings) having respective pluralities of first and second peaks facing away from each other and the optical film.

In some embodiments, for a substantially collimated, substantially normally incident light beam propagating in an incident plane (e.g., an xz-plane of the film, where z is a thickness direction of the film) that is orthogonal to the optical film and which defines a bisecting plane (e.g., a yz-plane orthogonal to the xz-plane) that includes the incident light beam and is orthogonal to the incident plane, and for at least a first wavelength in a first wavelength range extending from about 420 nm to about 1200 nm, the optical construction may have optical transmissions T1 and T1' along respective first and second transmission directions that are in the incident plane and on a same first side of the bisecting plane, and which make different respective first and second angles with the bisecting plane, and optical transmissions T2 and T2' along respective third and fourth transmission directions that are in the incident plane and on a same second, opposite the first, side of the bisecting plane, and make the respective first and second angles with the bisecting plane, such that T1>T2 and T2'>T1'. In some embodiments, for a substantially normally incident light having the at least the first wavelength, the optical film may have an optical reflectance of greater than about 80%, or greater than about 85%, or greater than about 90%, or greater than about 95%, or greater than about 96%, or greater than about 97%, or greater than about 98% for each of an in-plane first polarization state (e.g., a polarization aligned to an x-axis of the film) parallel to the incident plane and an in-plane orthogonal second polarization state (e.g., a polarization aligned to a y-axis of the film) parallel to the bisecting plane.

In some embodiments, the first and second structures may be first and second prisms extending along a same first direction (e.g., the film's y-axis), and each of the first and second prisms may include opposing first and second sides extending from opposite corresponding first and second ends of a base of the prism and meeting at the peak of the prism. In some embodiments, the first and second sides may make respective first and second base angles with the base of the prism. In some embodiments, the first and second base angles are different from each other by at least about 5 degrees. In some embodiments, the prism peaks of the first and second prismatic films may face away from each other and the optical film.

According to some aspects of the present description, an optical construction may include an optical film disposed between, and bonded to, first and second structured films. In some embodiments, the first and second structured films may include respective pluralities of regularly arranged first and second structures (e.g., such as prisms) having respective pluralities of first and second peaks facing away from each other and the optical film. In some embodiments, for a substantially collimated, substantially normally incident light beam propagating in an incident plane (e.g., an xz-plane of the construction) that is orthogonal to the optical film and defines a bisecting plane (e.g., a yz-plane of the construction) that includes the incident light beam and is orthogonal to the incident plane, and for at least first and second wavelengths that are at least 50 nm, or at least 75 nm, or at least 100 nm, or at least 125 nm, or at least 150 nm, or at least 175 nm, or at least 200 nm, or at least 250 nm, or at least 300 nm apart and disposed in a first wavelength range extending from about 420 nm to about 1200 nm, the optical construction may have respective optical transmissions T1 and T1' along a first transmission direction that is on a first side of the bisecting plane and which makes a first angle with the bisecting plane, and optical transmissions T2 and T2' along a second transmission direction that is on an opposite second side of the bisecting plane and which makes the first angle with the bisecting plane, such that T1>T2 and T2'>T1'. In some embodiments, for a substantially normally incident light having the at least the first wavelength, the optical film may have an optical reflectance of greater than about 80%, or greater than about 85%, or greater than about 90%, or greater than about 95%, or greater than about 96%, or greater than about 97%, or greater than about 98% for each of an in-plane first polarization state (e.g., polarized to the x-axis of the film and/or construction) parallel to the incident plane and an in-plane orthogonal second polarization state (e.g., polarized to the y-axis of the film and/or construction) parallel to the bisecting plane.

In some embodiments, the first and second structures may be first and second prisms extending along a same first direction (e.g., the y-axis of the film/construction). In some embodiments, each of the first and second prisms may include opposing first and second sides extending from opposite corresponding first and second ends of a base of the prism and meeting at the peak of the prism. In some embodiments, the first and second sides may make respective first and second base angles with the base of the prism. In some embodiments, the first and second base angles may be different from each other by at least about 5 degrees.

According to some aspects of the present description, an optical construction includes an optical film disposed between, and bonded to, first and second structured films. In some embodiments, the first and second structured films may include respective pluralities of regularly arranged first and second structures (e.g., linear prisms) having respective pluralities of first and second peaks facing away from each other and the optical film.

In some embodiments, the first and second structures are first and second prisms extending along a same first direction (e.g., a y-axis of the optical film). In some such embodiments, each of the first and second prisms may include opposing first and second sides extending from opposite corresponding first and second ends of a base of the prism and meeting at the peak of the prism. In some embodiments, the first and second sides making respective first and second base angles with the base of the prism. In some such embodiments, the first and second base angles may be different from each other by at least about 5 degrees.

In some embodiments, for a substantially collimated, substantially normally incident light beam propagating in an incident plane (e.g., an xz-plane of the optical construction, where z is a thickness direction of the optical construction) that is orthogonal to the optical film and which defines a bisecting plane (e.g., a yz-plane of the optical construction) that includes the incident light beam and is orthogonal to the incident plane, and for each wavelength in a first wavelength range extending from about 500 nm to about 1000 nm, the optical construction may have an optical transmission T1 along a first transmission direction that is on a first side of the bisecting plane and which makes a first angle with the bisecting plane, and an optical transmissions T2 along a second transmission direction that is on an opposite second side of the bisecting plane and which makes the first angle with the bisecting plane, such that T1 is greater than T2 by at least 1%, or at least 1.5%, or at least 2%. In some embodiments, for a substantially normally incident light having the at least the first wavelength, the optical film may have an optical reflectance of greater than about 80%, or greater than about 85%, or greater than about 90%, or greater than about 95%, or greater than about 96%, or greater than about 97%, or greater than about 98% for each of an in-plane first polarization state (e.g., a polarization state aligned to the x-axis of the construction) parallel to the incident plane and an in-plane orthogonal second polarization state (e.g., a polarization state aligned to the y-axis) parallel to the bisecting plane.

According to some aspects of the present description, an optical construction may include an optical film disposed between, and bonded to, first and second structured films. In some embodiments, the first and second structured films may include respective pluralities of regularly arranged first and second structures (e.g., linear prisms, or concentric circles of prisms) having respective pluralities of first and second peaks facing away from each other and the optical film.

In some embodiments, for a substantially collimated, substantially normally incident light beam propagating in an incident plane (e.g., an xz-plane of the optical construction) that is orthogonal to the optical film and which defines a bisecting plane (e.g., a yz-plane of the optical construction) that includes the incident light beam and is orthogonal to the incident plane, and for each of at least a first wavelength in a visible wavelength range extending from about 420 nm to about 680 nm and a second wavelength in an infrared wavelength range extending from about 700 nm to about 1200 nm, and for orthogonal first (e.g., aligned to the x-axis, such as p-polarized light) and second (e.g., y-axis, such as s-polarized light) polarization states, the optical construction may have respective optical transmissions T1 (e.g., p-pol transmission) and T2 (e.g., s-pol transmission), such that T1>T2.

In some embodiments, for a substantially normally incident light having the at least the first wavelength, the optical film has an optical reflectance of greater than about 80%, or greater than about 85%, or greater than about 90%, or greater than about 95%, or greater than about 96%, or greater than about 97%, or greater than about 98% for each of the first and second polarization states.

According to some aspects of the present description, an optical construction may include an optical film disposed between, and bonded to, first and second structured films. In some embodiments, the first and second structured films may include respective pluralities of regularly arranged first and second structures comprising respective pluralities of first and second peaks facing away from each other and the optical film.

In some embodiments, for a substantially collimated, substantially normally incident light beam propagating in an incident plane (e.g., an xz-plane of the optical film) that is orthogonal to the optical film and defines a bisecting plane (e.g., a yz-plane of the optical film) that includes the incident light beam and is orthogonal to the incident plane, and for at least a first wavelength in a first wavelength range extending from about 420 nm to about 1200 nm, and for orthogonal first and second polarization states, the optical construction may have respective optical transmissions T1 and T2 along a same first transmission direction that is on a first side of the bisecting plane and makes a first angle with the bisecting plane, and optical transmissions T1' and T2' along a same second transmission direction that is on an opposite second side of the bisecting plane and which makes the first angle with the bisecting plane, such that T1>T2 and T2'>T1'.

In some embodiments, for a substantially normally incident light having the at least the first wavelength, the optical film may have an optical reflectance of greater than about 80%, or greater than about 85%, or greater than about 90%, or greater than about 95%, or greater than about 96%, or greater than about 97%, or greater than about 98%) for each of the first (e.g., p-pol light) and second (e.g., s-pol light) polarization states.

According to some aspects of the present description, an optical construction including an optical film disposed between, and bonded to, opposing major first and second structured surfaces of the optical construction. In some embodiments, the major first and second structured surfaces may include respective pluralities of substantially planar, substantially linear first and second facets. In some embodiments, the first facets may extend along a same first length direction (e.g., along a y-axis of the optical film) and be arranged regularly along an orthogonal first width direction (e.g., along an x-axis of the optical film). In some embodiments, the second facets may extend along a same second length direction (e.g., along a y-axis of the film) and be arranged regularly along an orthogonal second width direction (e.g., along an x-axis of the optical film). In some embodiments, the first and second length directions making an angle of less than about 50 degrees, or less than about 45 degrees, or less than about 40 degrees, or less than about 35 degrees, or less than about 30 degrees, or less than about 25 degrees, or less than about 20 degrees, or less than about 15 degrees, or less than about 10 degrees, or less than about 5 degrees, or less than about 4 degrees, or less than about 3 degrees, or less than about 2 degrees with each other. In some embodiments, the first facets make an angle of less than about 90 degrees with the second facets.

In some embodiments, for a substantially normally incident light, for at least a visible wavelength range extending from about 420 nm to about 680 nm, and for each of in-plane orthogonal first and second polarization states, the optical film may have an average optical reflectance of greater than about 80%, or greater than about 85%, or greater than about 90%, or greater than about 95%, or greater than about 96%, or greater than about 97%, or greater than about 98%).

According to some aspects of the present description, an optical construction may include an optical film disposed between, and bonded to, first and second structured films. In some embodiments, the first and second structured films may include respective pluralities of regularly arranged first and second structures including respective pluralities of first and second peaks facing away from each other and the optical film. In some embodiments, the first and second structures may be microstructures and/or nanostructures.

In some embodiments, for a substantially collimated incident light beam propagating in an incident plane (e.g., an xz-plane of the optical film/construction) and incident at an incident location on the optical construction at a first incident angle of greater than about 5 degrees, or greater than about 10 degrees, or greater than about 15 degrees, or greater than about 20 degrees, or greater than about 25 degrees, or greater than about 30 degrees, or greater than about 35 degrees, or greater than about 40 degrees, or greater than about 50 degrees, or greater than about 55 degrees, or greater than about 60 degrees and which defines a bisecting plane (e.g., a yz-plane of the optical film/construction) that includes the incident location and is orthogonal to the incident plane, and for at least a first wavelength in a first wavelength range extending from about 420 nm to about 1200 nm, and for at least a first polarization state (e.g., p-polarization type), the optical construction may have respective optical transmissions S2 and S2' along a same first transmission direction that makes a first angle with the bisecting plane and is on an opposite side of the bisecting plane relative to the incident light, such that S2/S2'≥1.1, or S2/S2'≥1.2, or S2/S2'≥1.3, or S2/S2'≥1.4, or S2/S2'≥1.5.

According to some aspects of the present description, an optical construction may include an optical film disposed between, and bonded to, first and second structured films. In some embodiments, the first and second structured films may include respective pluralities of regularly arranged first and second structures including respective pluralities of first and second peaks (e.g., the peaks of linear prisms) facing away from each other and the optical film.

In some embodiments, the first and second structures may be first and second prisms extending along a same first direction (e.g., a y-axis of the optical construction). In some such embodiments, a cross-section of each of the first and second prisms as seen in a same second direction (e.g., a x-axis of the optical construction) substantially perpendicular to the first direction may have different surface areas. In some such embodiments, each of the first and second prisms may include opposing first and second sides extending from opposite corresponding first and second ends of a base of the prism and meeting at the peak of the prism. In some embodiments, the first and second sides may make respective first and second base angles with the base of the prism. In some such embodiments, the first and second base angles may be different from each other by at least about 5 degrees.

In some embodiments, for a substantially collimated incident light beam propagating in an incident plane (e.g., an xz-plane of the optical construction) and incident at an incident location on the optical construction at a first incident angle of greater than about 5 degrees, or about 10 degrees, or about 15 degrees, or about 20 degrees, or about 25 degrees, or about 30 degrees, or about 35 degrees, or about 40 degrees, or about 50 degrees, or about 55 degrees, or about 60 degrees and which defines a bisecting plane (e.g., a yz-plane of the optical construction) that includes the incident location and is orthogonal to the incident plane, and for at least a first wavelength in a first wavelength range extending from about 420 nm to about 1200 nm, and for at least a first polarization state (e.g., p-pol light), the optical construction may have an optical transmission S1 along a first transmission direction that makes a first angle with the bisecting plane when the incident light is on a same first side of the bisecting plane as the first transmission direction, and an optical transmission S2 along the first transmission direction when the incident light is on an opposite second side of the bisecting plane as the first transmission direction, such that S2/S1≥1.5, or S2/S1≥2, or S2/S1≥3, or S2/S1≥5, or S2/S1≥10, or S2/S1≥15, or S2/S1≥20, or S2/S1≥50, or S2/S1≥100.

Turning now to the figures, FIG. 1 provides a side view of an embodiment of an optical construction according to the present description. In some embodiments, an optical construction 100 includes an optical film (e.g., a multilayer optical film, or MOF) 10 disposed between, and bonded to, a first prismatic film 20 and a second prismatic film 30. In some embodiments, the first prismatic film 20 includes a plurality of substantially parallel, substantially linear first prisms 21 extending along a same first direction (e.g., the y-axis extending into the page, as shown in FIG. 1) of major first structured surface 27. In some embodiments, the second prismatic film 30 includes a plurality of substantially parallel, substantially linear second prisms 31 extending along a same first direction (e.g., the y-axis as shown in FIG. 1) of major second structured surface 37. In some embodiments, the plurality of first prisms 21 and the plurality of second prisms 31 face away from each other and optical film 10. In some embodiments, first prismatic film 20 and second prismatic film 30 may be bonded to optical film 10 by one or more adhesive layers 12.

In some embodiments, for a substantially collimated, substantially normally incident light beam 43 propagating in an incident plane 41 (shown as a rectangle in the xz-plane shown in FIG. 1) that is orthogonal to optical film 10 and which defines a bisecting plane 44 (shown as a dashed line in the yz-plane of FIG. 1, which includes a normal 60 to optical film 10) that includes incident light beam 43 and is orthogonal to incident plane 41, and for at least a first wavelength (e.g., 1000 nm) in a first wavelength range extending from about 420 nm to about 1200 nm, the optical construction may have different optical transmissions T1 and T1' along respective first 70 and second 71 transmission directions that are in the incident plane 41 and on a same first side 45 of bisecting plane 44, and make different respective first −θt1 (e.g., −20 degrees) and second −θt2 angles (e.g., −40 degrees) with bisecting plane 44, and different optical transmissions T2 and T2' along respective third 73 and fourth 74 transmission directions that are in the incident plane and on a same second side 46 of the bisecting plane, opposite the first side 45, and make the respective first +θt1 (e.g., +20 degrees) and second −θt2 (e.g., +40 degrees) angles with the bisecting plane, wherein T1>T2 and T2'>T1'.

FIGS. 2A-2D provide additional details on the optical construction of FIG. 1, according to an embodiment of the present description. FIG. 2A shows a representation of the optical film 10 of FIG. 1 and a substantially normally incident light 40 impinging on the optical film 10. FIG. 2A is representational and primarily for discussion purposes. It should be noted that a substantially normally incident light 40 would be transmitted or reflected by optical film 10 differently than normally incident light 43 on the optical construction 100, which includes both the optical film 10 and first 20 and second 30 prismatic films of FIG. 1. In some embodiments, optical construction 100 of FIG. 2B will transmit at least 1%, or at least 1.2%, or at least 1.4%, or at least 1.6%, or at least 1.8%, or at least 2%, or at least 2.1% of incident light 43 as a first transmitted light 42, which propagates at an oblique angle α1 of greater than about 5 degrees, or greater than about 10 degrees, or greater than about 20 degrees, or greater than about 30 degrees, or greater than about 40 degrees, or greater than about 50 degrees, or greater than about 55 degrees with respect to the normal 60 of optical film 10 (and optical construction 100) as shown in FIG. 2B).

FIGS. 2C and 2D illustrate additional details on the first prisms 21 and second prisms 31, respectively. Looking at FIG. 2C, each of first prisms 21 has a first side 22 and opposing second side 23 extending from a first end 24a and an opposite second end 24b of a base 24 of first prism 21. First side 22 and second side 23 meet at a peak 25 of first prism 21. First 22 and second 23 sides make respective first 26a and second 26b base angles with the base 24 of first prism 21. In some embodiments, the first base angle 26a and second base angle 26b may be different from each other by at least about 5 degrees.

Looking at FIG. 2D, each of second prisms 31 has a first side 32 and opposing second side 33 extending from a first end 34a and an opposite second end 34b of a base 34 of second prism 31. First side 32 and second side 33 meet at a peak 35 of second prism 31. First 32 and second 33 sides make respective first 36a and second 36b base angles with the base 34 of second prism 31. In some embodiments, the first base angle 36a and second base angle 36b may be different from each other by at least about 5 degrees.

As also shown in FIG. 1, base 24 of first prism 21 and base 34 of second prism 31 face toward each other (and toward optical film 10), and peaks 25 of first prism 21 and peak 35 of second prism 31 face away from each other (and away from optical film 10).

Figure 3A:
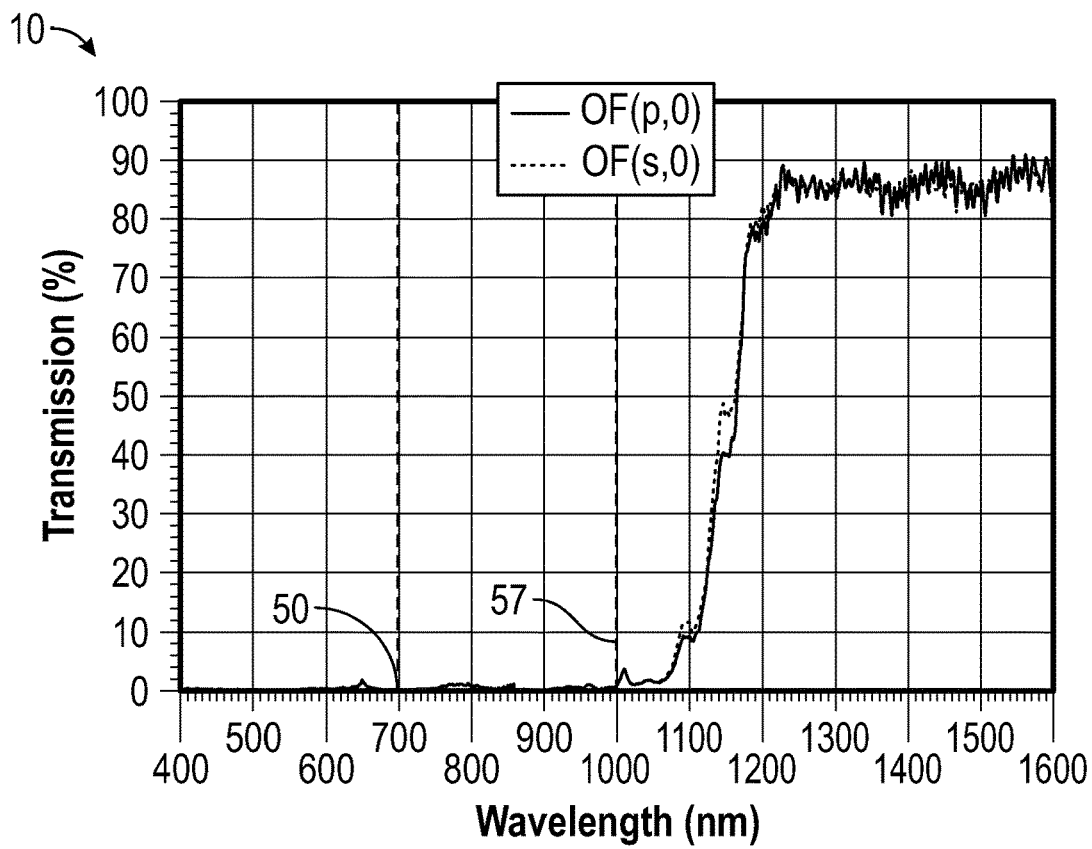
FIGS. 3A-3B are graphs of the transmission percent versus wavelength for an embodiment of an optical film, in accordance with an embodiment of the present description.
Figure 3B:
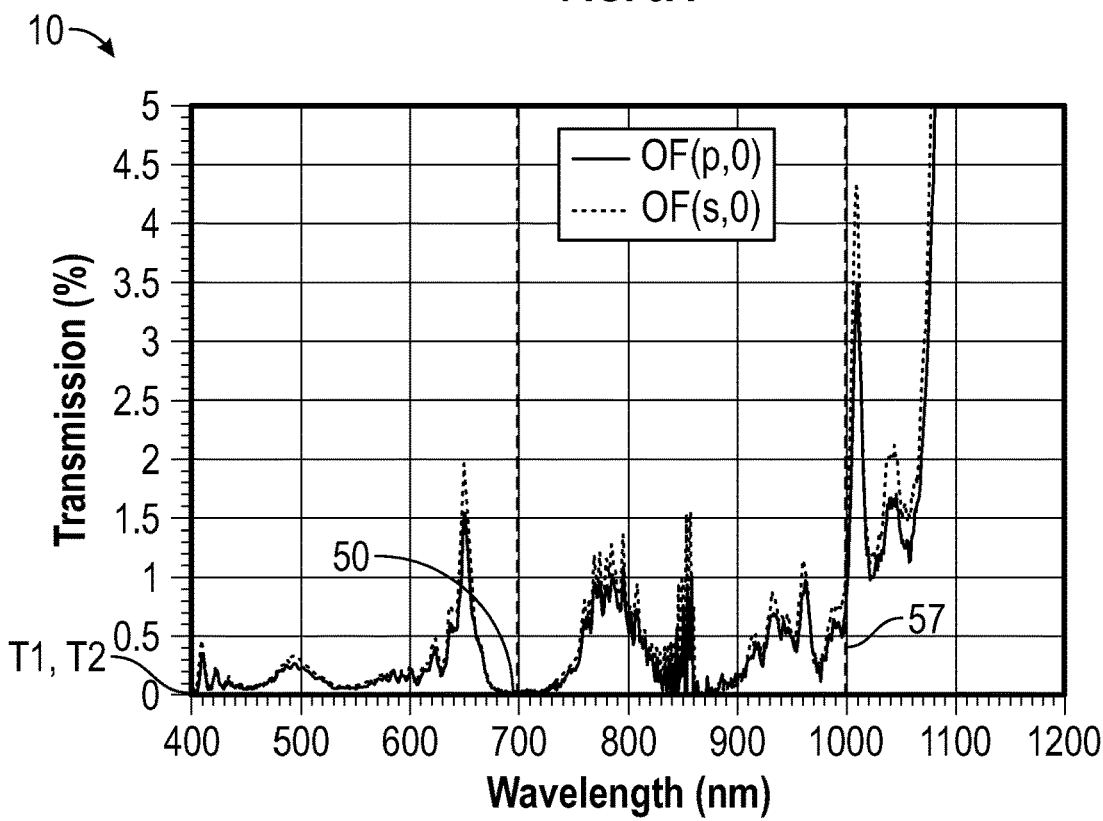

FIGS. 3A-3B are graphs of the transmission percent versus wavelength for an embodiment of optical film 10 of FIG. 1. FIGS. 4A-4B are tables summarizing the graphs of FIGS. 3A-3B It should be noted that FIGS. 3A and 3B provide identical information, except that FIG. 3B shows a close-up view of a portion of the full graph in FIG. 3A. FIGS. 3A-3B and FIGS. 4A-4B may be examined together for the following discussion.

In some embodiments, for a substantially collimated, substantially normally incident light (such as normally incident light 40 of FIG. 2A, or light 43 of FIG. 1), for at least a first wavelength 50 (e.g., 700 nm) in a first wavelength range extending from about 420 nm to about 1200 nm, and for each of mutually orthogonal in-plane first polarization state (e.g., light polarized to the x-direction of optical film 10, as shown in FIG. 1) and a second polarization state (e.g., light polarized to the y-direction of optical film 10, as shown in FIG. 1), the optical film may have an optical transmission of less than about 1%, or less than about 0.09%, or less than about 0.08%, or less than about 0.07%, or less than about 0.06%, or less than about 0.05%, or less than about or less than about 0.03%. For example, refer to optical transmissions 51 and 52 in the summary table of FIG. 4A, which each shown a transmission percentage of 0.02% at 700 nm for normally incident light.

The columns of the tables of FIGS. 4A and 4B are headed with labels of the format:

OF(x,n)

where OF refers to the optical film 10, the "x" refers to a specific polarization of light (such as p-type or s-type polarization), and "n" is the angle of incidence of the incoming light. For example, a column labeled OF(p,30) in Table 4A refers to the transmission percentage of p-polarized light through optical film 10 when the incoming angle of incidence is 30 degrees.

Looking at the tables of FIGS. 4A and 4B, for light (such as incident light 47 in FIG. 1) incident at an incident angle (such as −θi and/or +θi shown in FIG. 1) of greater than about 30 degrees, or about 35 degrees, or about 40 degrees, or about 45 degrees, or about 50 degrees, or about 55 degrees, for each of the first and second polarization states, and for the at least the first wavelength 50 of FIG. 3A (e.g., 700 nm), the optical film 10 may have an optical transmission 55, 56 of less than about 1%, or less than about 0.9%, or less than about 0.8%, or less than about 0.7%, or less than about 0.6%, or less than about 0.5%, or less than about 0.4%, or less than about 0.3%, or less than about 0.2%. For example, optical transmissions for p-polarized light at 50 degrees and 60 degrees of incidence (indicated by reference designator 55 in FIG. 4A) is 0.13% and 0.0%, respectively. Also, optical transmissions for s-polarized light at 50 degrees and 60 degrees of incidence (indicated by reference designator 56 in FIG. 4A) is 0.04% and 0.02%, respectively.

In some embodiments, for a substantially normally incident light (such as incident light 40 in FIG. 2A), for at least a visible wavelength range extending from about 420 nm to about 680 nm, and for each of in-plane orthogonal first (e.g., light polarized to the x-axis of the optical film, such as a p-polarized light) and second (e.g., light polarized to the y-axis of the optical film, such as an s-polarized light) polarization states, the optical film may have an average optical reflectance of greater than about 80%, or greater than about 85%, or greater than about 90%, or greater than about 95%, or greater than about 96%, or greater than about 97%, or greater than about 98%. For example, looking at FIG. 4A, normally incident light (0 degrees offset from a normal to the optical film) in a wavelength range of 420 to 680 nm and with a p-polarization type (see 88 in FIG. 4A) has an optical transmission of 0.21 percent, which translates to an optical reflection of (100%−=99.79%. For another example, looking again at FIG. 4A, normally incident light (0 degrees offset from a normal to the optical film) in a wavelength range of 420 to 680 nm and with an s-polarization type (see 89 in FIG. 4A) has an optical transmission of 0.26 percent, which translates to an optical reflection of (100%−0.26%)= 99.74%.

FIG. 4B provides summary tables of light transmission percentages for a first wavelength of 1000 nm in a first wavelength range extending from about 420 nm to about 1200 nm. For example, see first wavelength 57 in FIGS. 3A and 3B. As shown in FIGS. 3A and 3B, and the summary table in FIG. 4B, for a substantially normally incident light (such as incident light 40 in FIG. 2A) having the at least the first wavelength 57, the optical film has an optical reflectance of greater than about 80%, or greater than about 85%, or greater than about 90%, or greater than about 95%, or greater than about 96%, or greater than about 97%, or greater than about 98% for each of an in-plane first polarization state (e.g., light polarized to the x-axis of the optical film, such as a p-polarized light) parallel to the incident plane and an in-plane orthogonal second polarization state (e.g., light polarized to the y-axis of the optical film, such as an s-polarized light) parallel to the bisecting plane (such as bisecting plane 44 in FIG. 1).

For example, looking at FIG. 4B, normally incident light (0 degrees offset from a normal to the optical film) in a wavelength range of 420 to 1200 nm and with a p-polarization type (see 58 in FIG. 4B) has an optical transmission of 0.92 percent, which translates to an optical reflection of (100%−0.92%)=99.08%. For another example, looking again at FIG. 4B, normally incident light (0 degrees offset from a normal to the optical film) in a wavelength range of 420 to 1200 nm and with an s-polarization type (see 59 in FIG. 4B) has an optical transmission of 1.25 percent, which translates to an optical reflection of (100%−1.25%)= 98.75%.

Figure 5A:
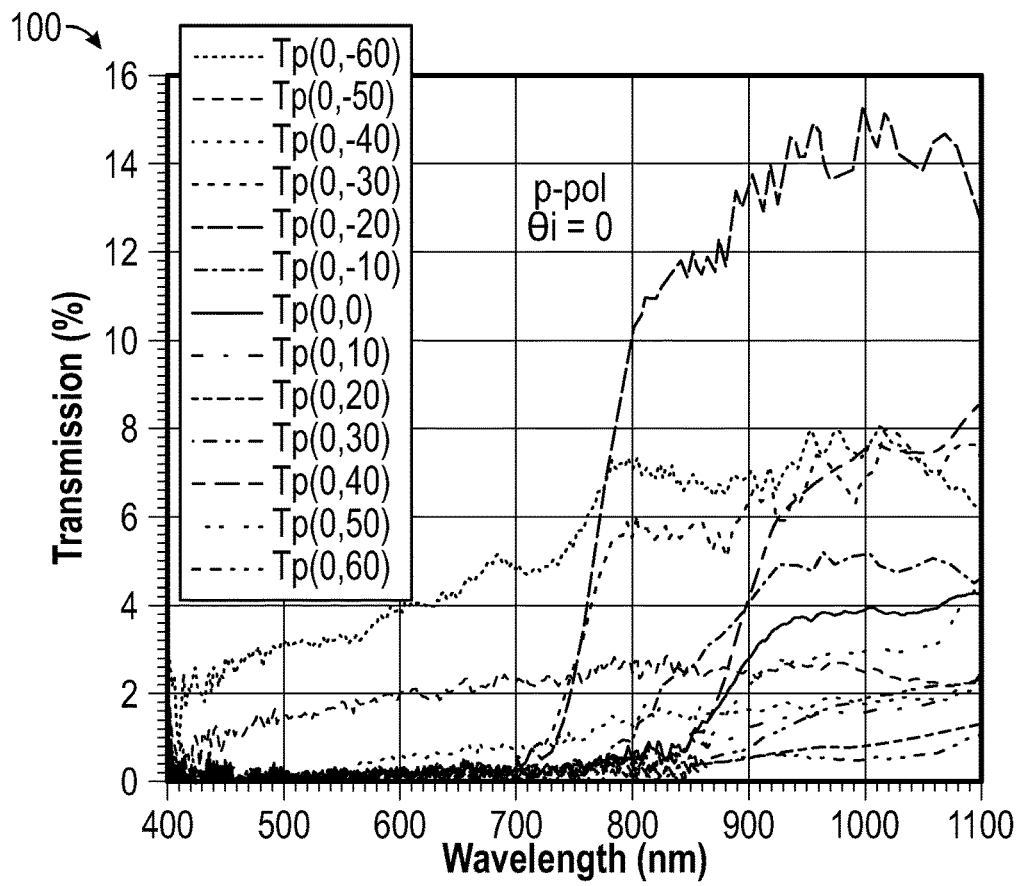
FIGS. 5A-5B are graphs of the transmission percent versus wavelength for an embodiment of an optical construction, in accordance with an embodiment of the present description.

While FIGS. 3A-3B and 4A-4B provided details on the optical performance of an optical film (such as optical film 10 in FIG. 1), FIGS. 5A-11B provide details on the optical performance of an optical construction (such as optical construction 100 in FIG. 1). As described elsewhere herein, optical construction 100 includes optical film 10 disposed between, and bonded to, first 20 and second 30 structured films. Optical construction 100, therefore, different transmission percentage curves for different polarization types and for different angles of incidence, as shown in FIGS. 5A and 5B. FIG. 5A provides plots of transmission percentages for p-polarized light at angles from −60 degrees incidence to +60 degrees incidence, and FIG. 5B provides plots of transmission percentages for p-polarized light at angles from −60 degrees incidence to +60 degrees incidence. The legend for each of the charts in FIGS. 5A and 5B is of the format:

Ty(0,n)

where T refers to the transmission percentage plot, y is either "p" for p-polarized light or "s" for s-polarized light, "0" indicates an angle of incidence of 0 degrees (which applies to all plots in FIGS. 5A and 5B), and "n" is the angle of transmission of the outgoing light. For example, a label of Ts(0,30) would refer to a transmission plot of s-polarized light through optical construction 100 when the incoming angle of incidence is 0 degrees and the angle of transmission is 30 degrees from normal. The plots of FIGS. 5A and 5B are the foundation (source data) for the plots explored in FIGS. 7A through 11B, discussed elsewhere herein.

Figure 5B:
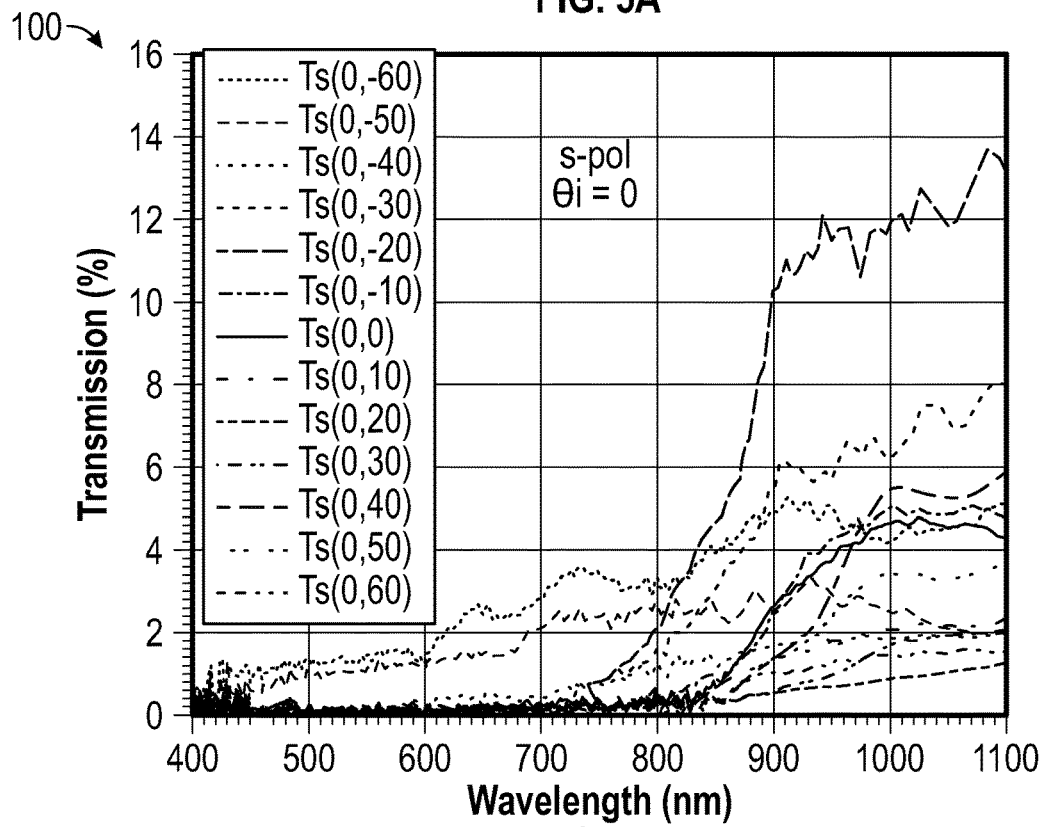

FIG. 6 is a table summarizing the graphs of FIGS. 5A-5B, showing values of optical transmission at various wavelengths and wavelength ranges over several different angles of transmission for normally incident light.

For an optical construction such as optical construction 100 shown in FIG. 1, the optical construction may transmit at least 1%, or at least 1.2%, or at least 1.4%, or at least 1.6%, or at least 1.8%, or at least 2%, or at least 2.1% of the incident light as a first transmitted light (see also FIG. 2B and first transmitted light 42) propagating at an oblique angle α1 of greater than about 5 degrees, or greater than about 10 degrees, or greater than about 20 degrees, or greater than about degrees, or greater than about 40 degrees, or greater than about 50 degrees, or greater than about 55 degrees with respect to a normal (e.g., normal 60 in FIG. 2A) to the optical film 100. For example, the transmission of p-polarized light Tp at −60 degrees is 4.81% and at −50 degrees is 2.27% (see 53 in FIG. 6). For another example, the transmission of s-polarized light Ts at −60 degrees is 2.78% and at −50 degrees is 2.12% (see 54 in FIG. 6).

Figure 7A:
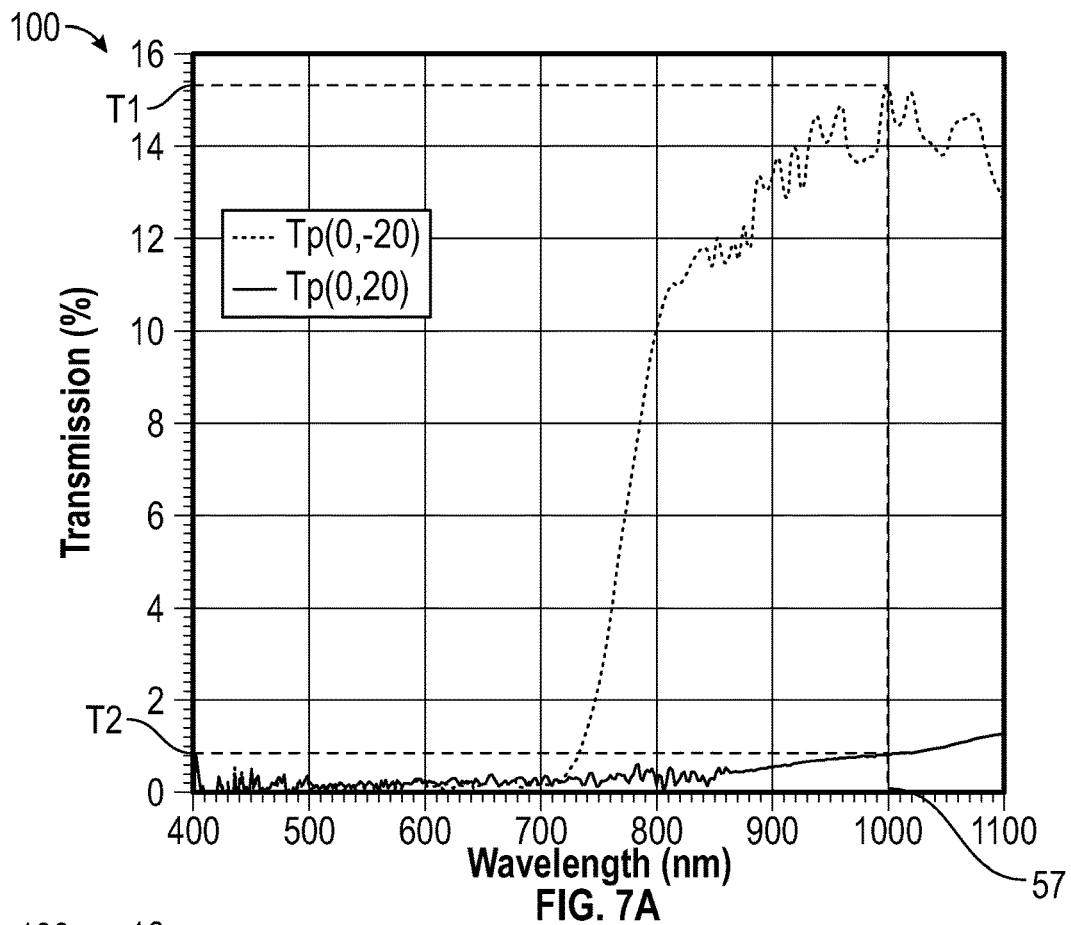
FIGS. 7A-7B are graphs of the transmission percent versus wavelength for an embodiment of an optical construction, in accordance with an embodiment of the present description.
Figure 7B:
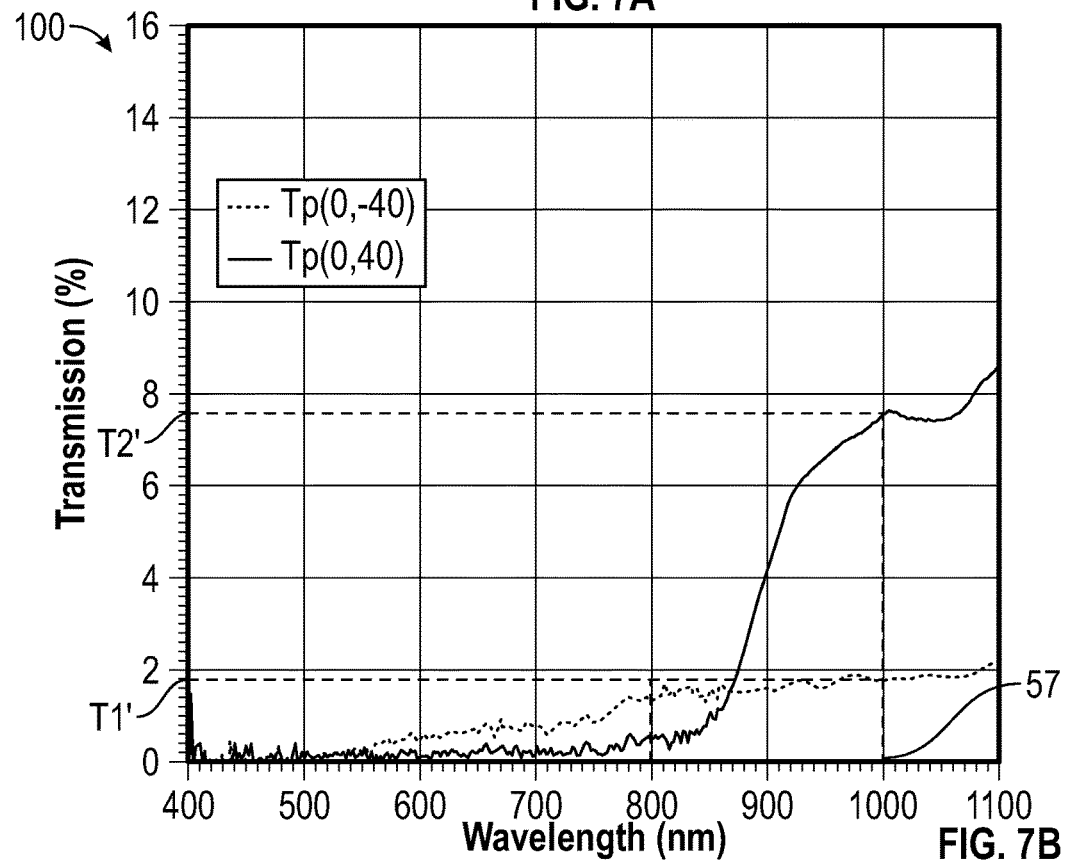

The optical construction of FIG. 1 may exhibit a transmission asymmetry on opposing sides of a bisecting plane, such as bisecting plane 44 in FIG. 1. FIGS. 7A-7B are graphs of the transmission percent versus wavelength for an embodiment of an optical construction demonstrating this transmission asymmetry. Looking at the optical construction of FIG. 1 and FIGS. 7A and 7B, it is shown that the optical construction 100 may have optical transmissions T1 and T1' along respective first 70 and second 71 transmission directions that are in the incident plane 41 and on a same first side 45 of the bisecting plane 44, which make different respective first −θt1 and second −θt2 angles with the bisecting plane 44. For example, −θt2 (the transmission angle associated with transmission T1 in transmission direction 70) at first wavelength 1000 nm (wavelength 57 in FIGS. 7A and 7B) may be −20 degrees (shown in FIG. 7A) and −θt2 (the transmission angle associated with transmission T1' in transmission direction 71) may be −40 degrees (shown in FIG. 7B).

Also, the optical construction 100 may have optical transmissions T2 and T2' along respective third 73 and fourth 74 transmission directions that are in the incident plane 41 and on a same second side 46 of the bisecting plane 44, which make different respective first +θt1 and second +θt2 angles with the bisecting plane 44. For example, +θt1 (the transmission angle associated with transmission T2 in transmission direction 73) at first wavelength 1000 nm (wavelength 57 in FIGS. 7A and 7B) may be +20 degrees (shown in FIG. 7A) and +θt2 (the transmission angle associated with transmission T2' in transmission direction 74) may be +40 degrees (shown in FIG. 7B).

In some embodiments, as shown in FIGS. 7A and 7B, transmission T1 may be greater than transmission T2 and transmission T2' may be greater than T1'.

Figure 8A:
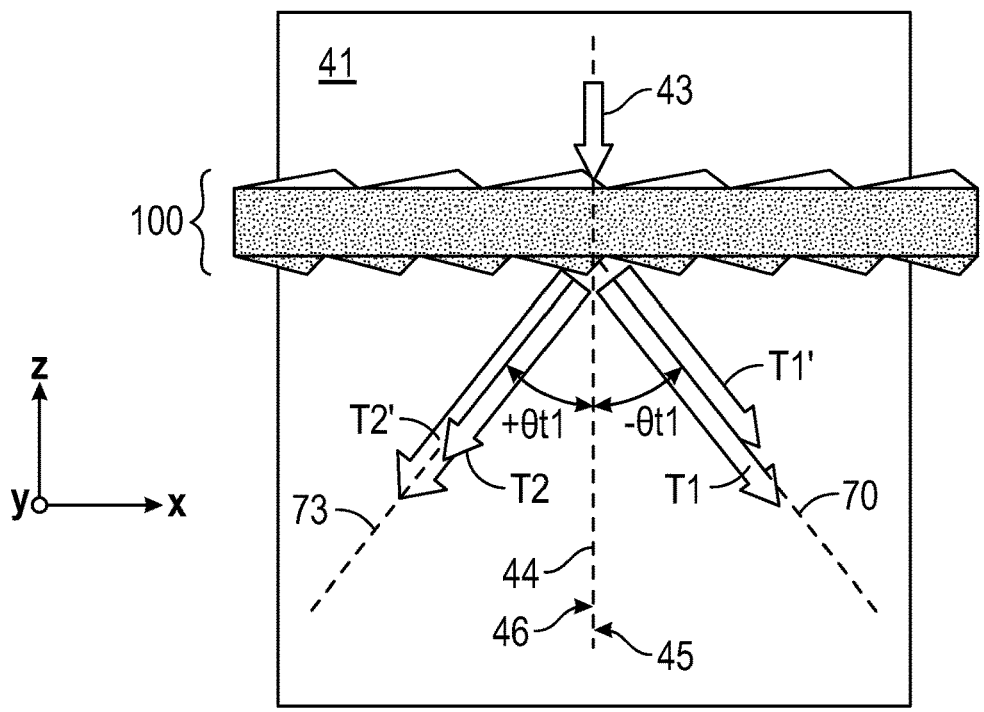
FIGS. 8A-8B describe the transmission percent versus wavelength for an optical construction, in accordance with another embodiment of the present description.

In some embodiments, the percent transmission of optical construction 100 may be higher on one side of bisecting plane 44 at one wavelength and one polarization type, and then lower on that same side of bisecting plane 44 at a different wavelength and the same polarization type. Consider the embodiment of FIG. 8A. FIG. 8A is a less-detailed view of the optical construction of FIG. 1, with an optical construction 100 including optical film disposed between, and bonded to, first and second structured films, as described for FIG. 1.

In some embodiments, for a substantially collimated, substantially normally incident light beam 43 propagating in an incident plane 41 that is orthogonal to the optical construction 100 and defines a bisecting plane 44 that includes incident light beam 43 and is orthogonal to incident plane 41, and for at least first wavelength (wavelength 80 shown in FIG. 8B, e.g., 800 nm) and a second wavelength (wavelength 57 shown in FIG. 8B, e.g., 1000 nm) that are at least 50 nm apart and disposed in a first wavelength range extending from about 420 nm to about 1200 nm, the optical construction may have respective optical transmissions T1 and T1' along a first transmission direction 70 that is on a first side 45 of the bisecting plane and which make a first angle with the bisecting plane (first angle −θt1, e.g., −40 degrees), and optical transmissions T2 and T2' along a second transmission direction 73 that is on an opposite second side 46 of bisecting plane 44 and makes the first angle (with opposite sign) with the bisecting plane 44 (first angle +θt1, e.g., +40 degrees), such that T1 is greater than T2 and T2' is greater than T1'.

Figure 8B:
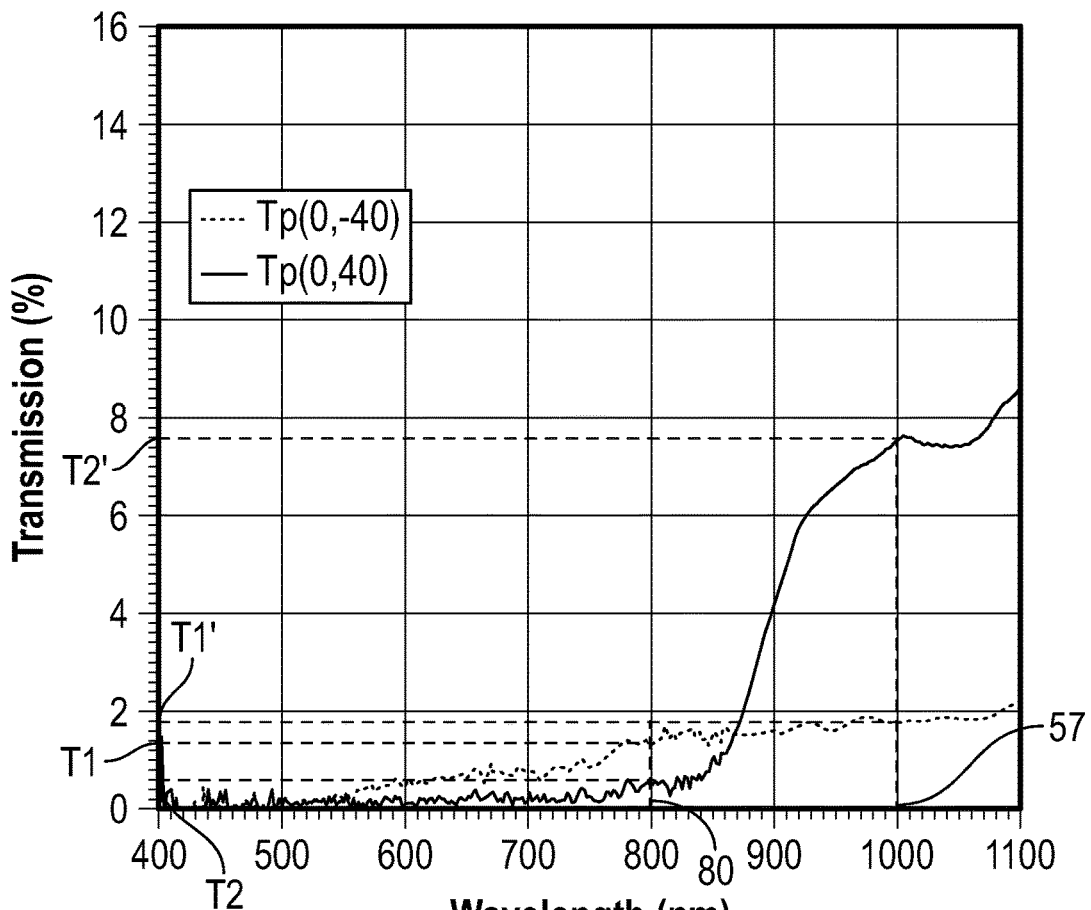

This transmission "crossover" can be seen best in FIG. 8B, which corresponds to the optical construction 100 shown in FIG. 8A. The plots of FIG. 8B shown transmission values for p-polarized light (Tp) at a transmission angle of −40 degrees and +40 degrees (i.e., transmissions at degrees from and on opposite sides of the bisecting plane 44). At first wavelength 800 nm, it can be seen that T1 is greater than T2 (i.e., the transmission T1 on side 45 of bisecting plane 44 is greater than transmission T2 on side 46 of bisecting plane 44). However, at second wavelength 1000 nm, the transmission amounts "switch" such that transmission T2' on second side 46 of bisecting plane 44 is now greater than transmission T1' on side 45 of bisecting plane 44.

Figure 9:
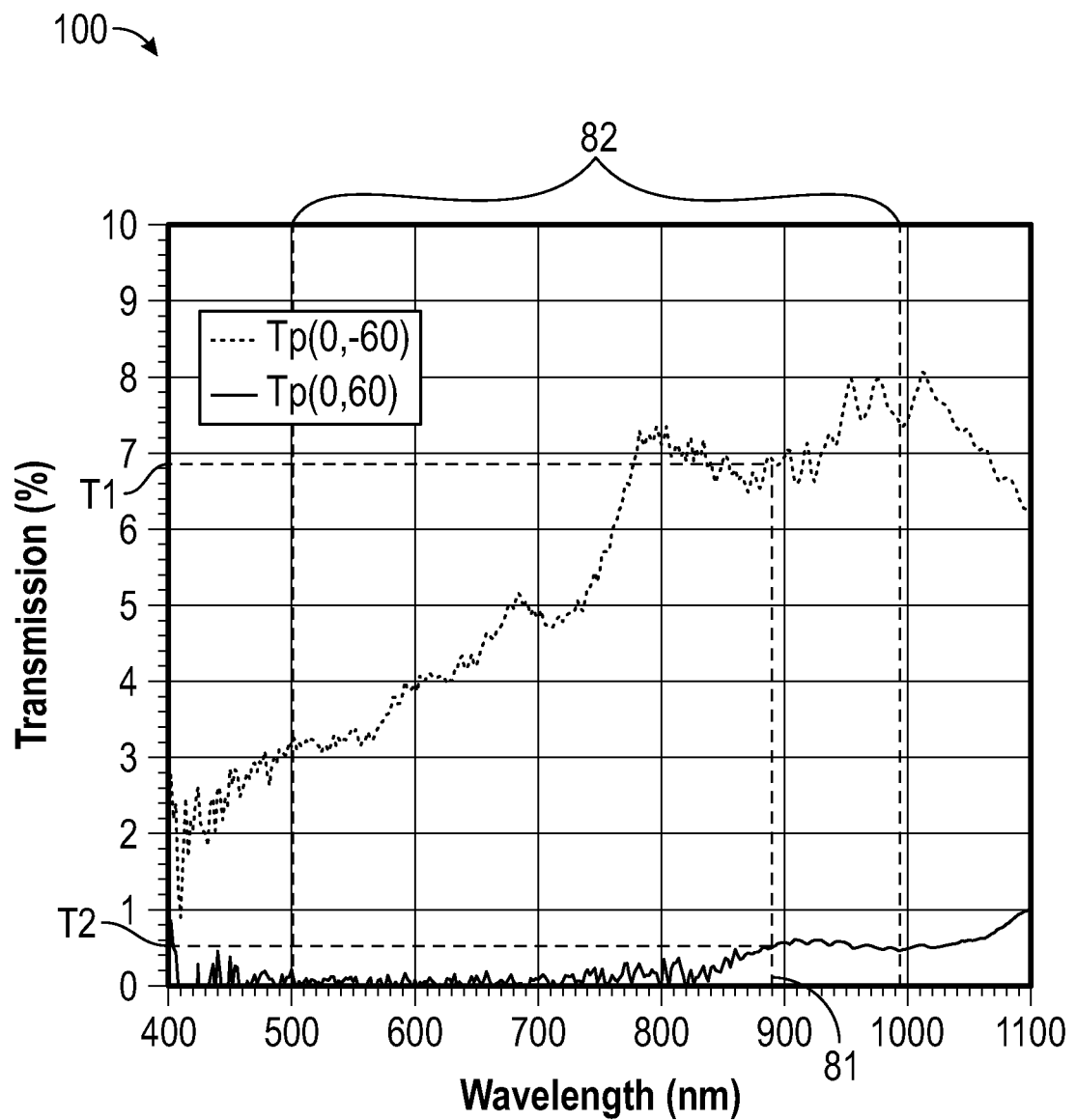
FIG. 9 is yet another graph of the transmission percent versus wavelength for an optical construction, in accordance with another embodiment of the present description.

The transmission crossover demonstrated in FIGS. 8A and 8B does not occur in all embodiments of optical construction 100. FIG. 9 demonstrates the transmission percent versus wavelength for an embodiment of an optical construction of FIG. 1 where this does not occur. Looking at FIGS. 1 and 9 together, for a substantially collimated, substantially normally incident light beam 43 propagating in an incident plane 41 that is orthogonal to optical film 10 and which defines a bisecting plane 44 that includes incident light beam 43 and is orthogonal to incident plane 41, and for each wavelength 81 (e.g., see wavelength 81, FIG. 9) in a first wavelength range 82 extending from about 500 nm to about 1000 nm, the optical construction may have an optical transmission T1 along a first transmission direction 70 that is on a first side 45 of the bisecting plane and which makes a first angle −θt1 (e.g., −60 degrees) with bisecting plane 44, and an optical transmission T2 along a second transmission direction 73 that is on an opposite second side 46 of bisecting plane 44 and makes the first angle +θt1 (e.g., +60 degrees) with the bisecting plane, T1 may be greater than T2 by at least 1%, or at least 1.5%, or at least 2%. For example, looking at the graph of FIG. 9, at each wavelength between 500 nm and 1000 nm (range 82), the transmission percent of the T1 plot is at least 2% higher than the corresponding transmission percent of the T2 plot.

Figure 10A:
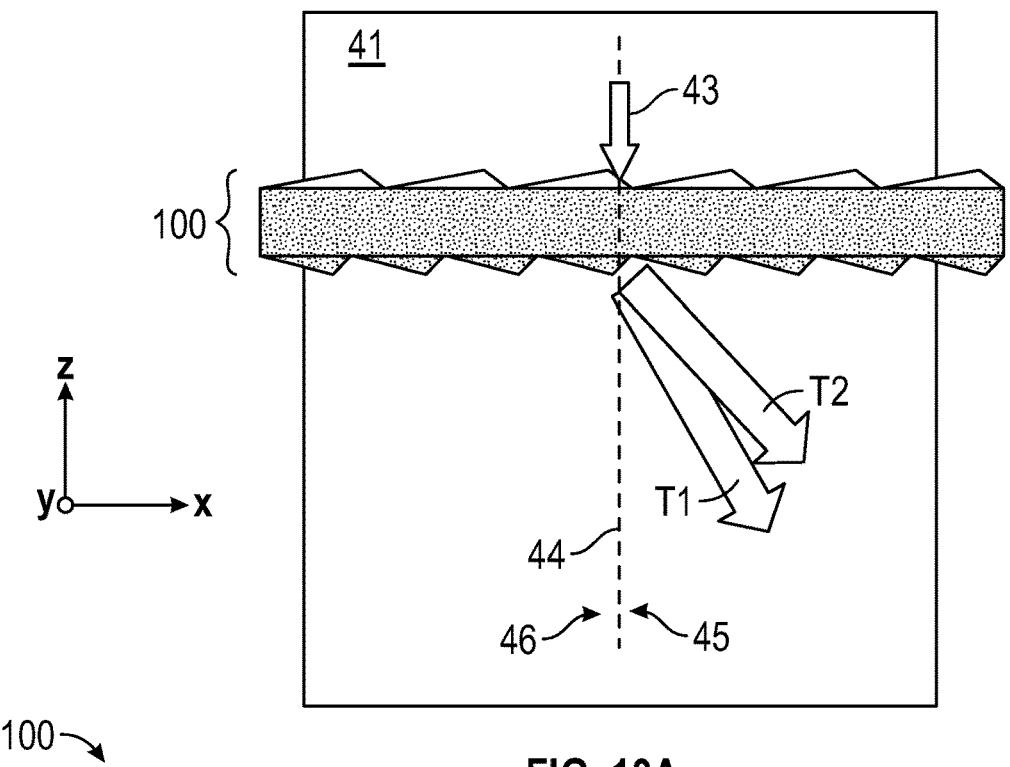
FIGS. 10A-10B describe the transmission percent versus wavelength of an optical construction, in accordance with another embodiment of the present description.
Figure 10B:
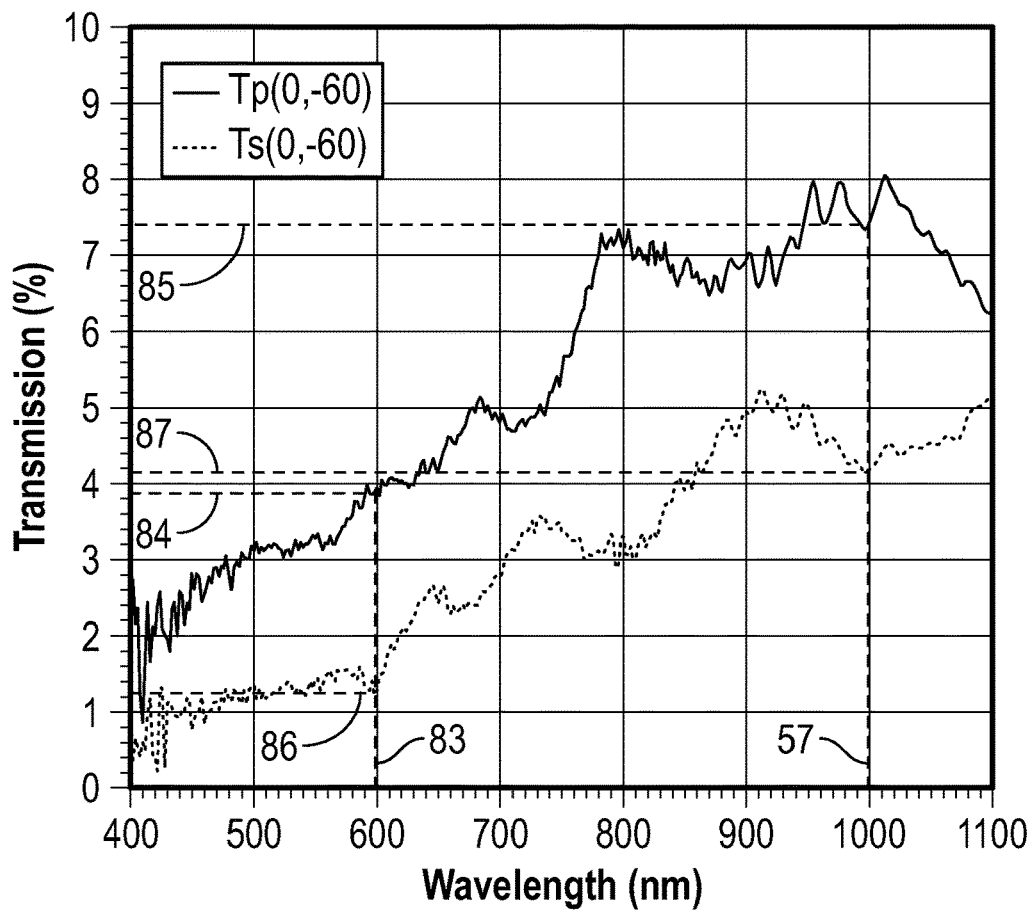

In some embodiments, the optical construction described herein may show polarization-based transmission asymmetry between two different wavelength ranges (e.g., between visible and infrared wavelengths) on the same side of the bisecting plane. FIGS. 10A and 10B illustrate an example of this polarization-based transmission asymmetry. FIG. 10A shows an optical construction such as optical construction 100 of FIG. 1. In some embodiments, for a substantially collimated, substantially normally incident light beam 43 propagating in an incident plane 41 that is orthogonal to the optical film (i.e., the optical film that is a part of optical construction 100) and which defines a bisecting plane 44 that includes incident light beam 43 and is orthogonal to incident plane 41, and for each of at least a first wavelength (wavelength 83 in FIG. 10B, e.g., 600 nm) in a visible wavelength range extending from about 420 nm to about 680 nm and a second wavelength (wavelength 57 in FIG. 10B, e.g., 1000 nm) in an infrared wavelength range extending from about 700 nm to about 1200 nm, and for a first polarization state (e.g., p-polarized) and an orthogonal second polarization state (e.g., s-polarized), the optical construction may have respective optical transmissions T1 (see transmission 84, 85 in FIG. 10B, representing p-polarized light) and T2 (see transmissions 86, 87 in FIG. 10B, representing s-polarized light), such that T1 is greater than T2 (that is, transmission 85 at second wavelength 57 is greater than transmission 84 at first wavelength 83, and transmission 87 at second wavelength 57 is greater than transmission 86 at first wavelength 83).

Figure 11A:
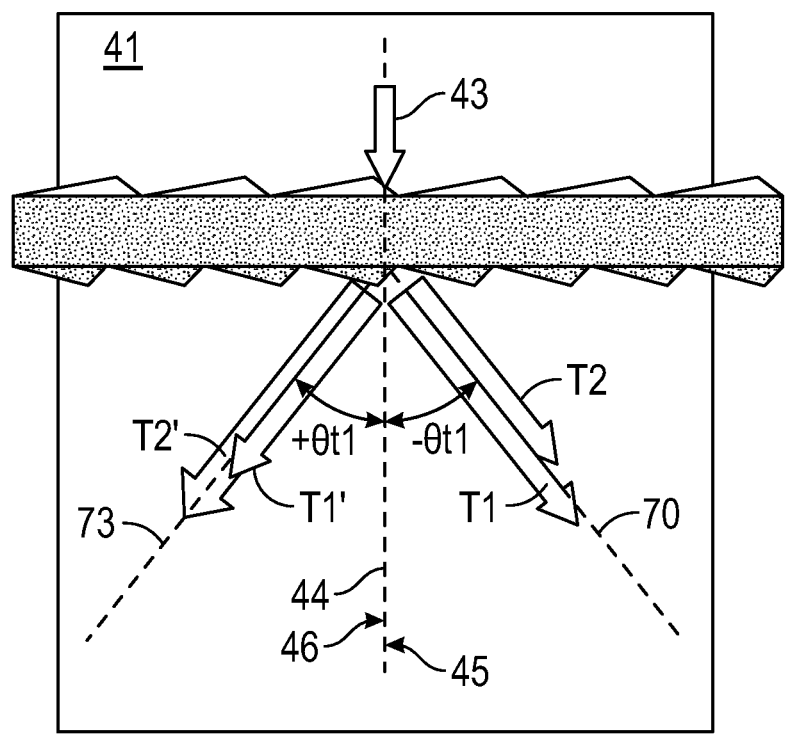
FIGS. 11A-11C describe the transmission percent versus wavelength of an optical construction, in accordance with another embodiment of the present description.
Figure 11B:
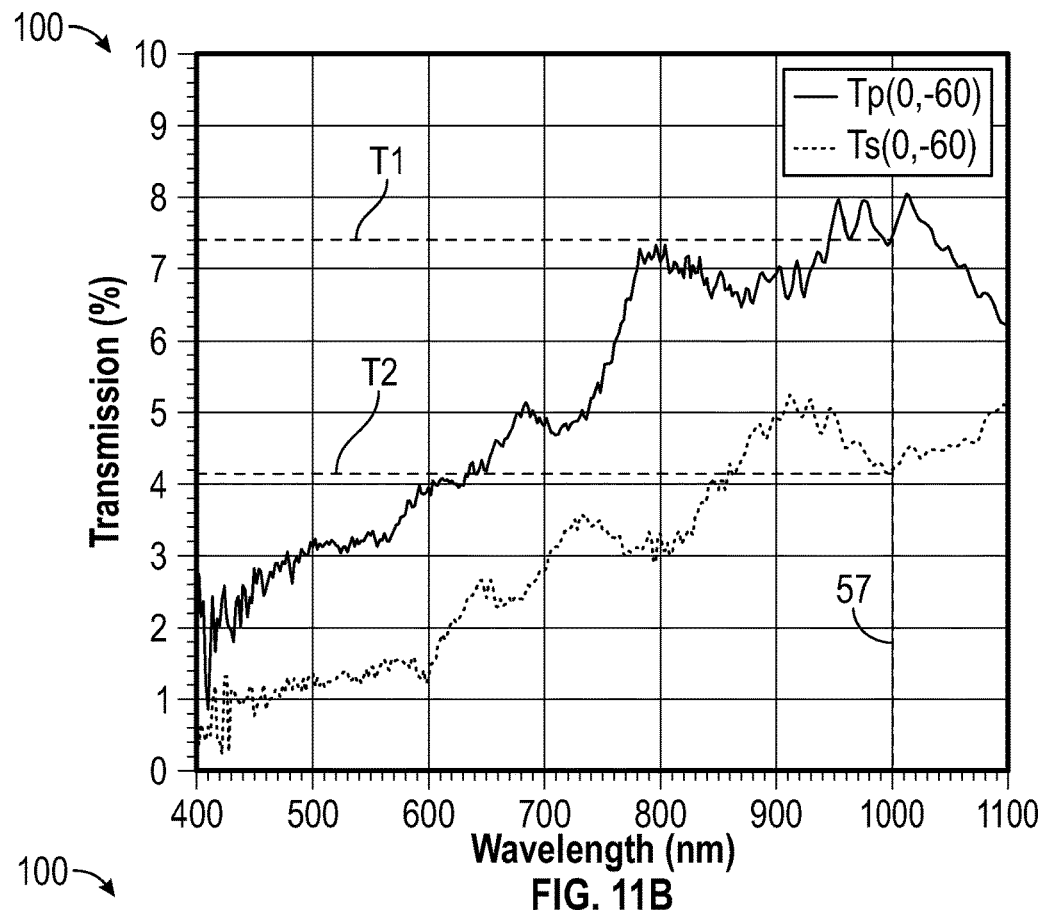
Figure 11C:
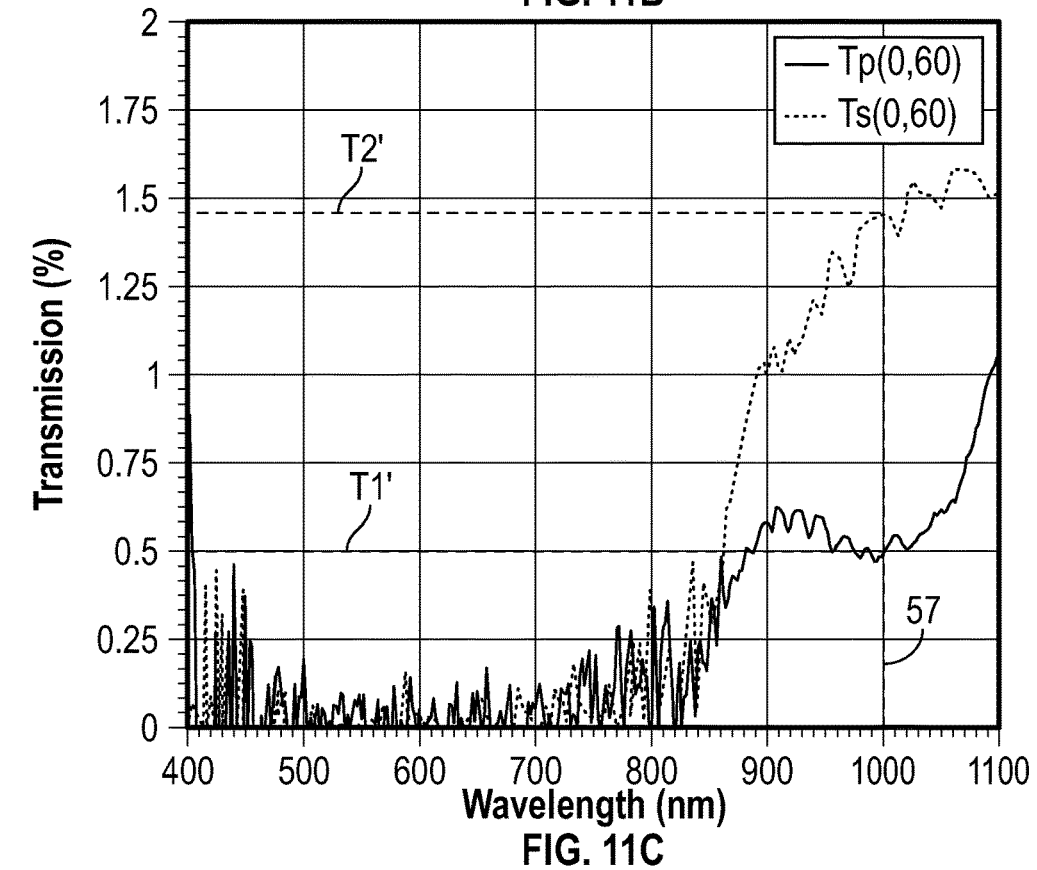

In some embodiments, the optical construction described herein demonstrates a "crossover" or flipping of transmission percentages between one polarization type and another, the crossover being transmission angle dependent. FIGS. 11A-11C illustrate this transmission angle flipping of polarization types for the optical transmission, and all three figures should be reviewed together for the following discussion.

FIG. 11A shows an embodiment of optical construction 100 similar to optical construction 100 of FIG. 1. In some embodiments, for a substantially collimated, substantially normally incident light beam 43 propagating in an incident plane 41 that is orthogonal to optical film 10 (part of optical construction 100) which defines a bisecting plane 44 that includes incident light beam 43 and is orthogonal to incident plane 41, and for at least a first wavelength (wavelength 57 shown in FIGS. 11B and 11C, e.g., 1000 nm) in a first wavelength range extending from about 420 nm to about 1200 nm, and for orthogonal first (e.g., p-polarized light) and second (e.g., s-polarized light) polarization states, the optical construction may have respective optical transmissions T1 and T2 along a same first transmission direction 70 that is on a first side 45 of the bisecting plane 44 and which make a first angle (−θt1 in FIG. 11A, e.g., −60 degrees) with bisecting plane 44, and optical transmissions T1' and T2' along a same second transmission direction 73 that is on an opposite second side 46 of bisecting plane 44 and which makes the first angle (same but opposite sign, +θt1 in FIG. 11A, +60 degrees) with bisecting plane 44, such that T1 is greater than T2 and T2' is greater than T1'. That is, on one side of bisecting plane 44, T1 (the transmission of p-polarized light) is greater than T2 (the transmission of s-polarized light), and on the opposite side of bisecting plane 55, T2' (the transmission of s-polarized light) is greater than T1' (the transmission of p-polarized light), all transmission percentages measured at first wavelength 57 (e.g., 1000 nm).

FIGS. 12A-12D provide side views of various embodiments of first prism 21 and second prism 31 for an optical construction, such as optical construction 100 in FIG. 1. It should be noted that first prism 21 and second prism 31 are shown directly adjacent one another in the figures and without optical film 10 or the substrates of prismatic films 20 and 30. This is done for comparison and illustration purposes, as the following discussion focuses on the structure of the prisms themselves.

Figure 12A:
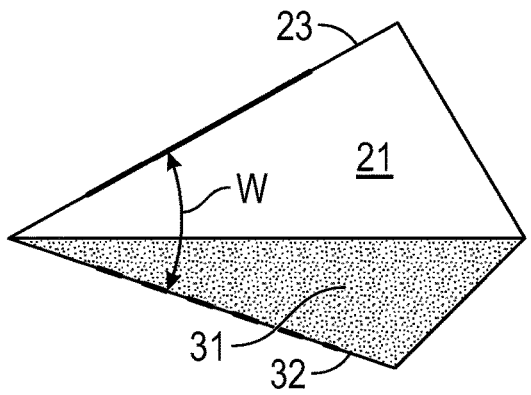
FIGS. 12A-12D provide side views of first and second prisms for an optical film, in accordance with an embodiment of the present description.
Figure 12B:
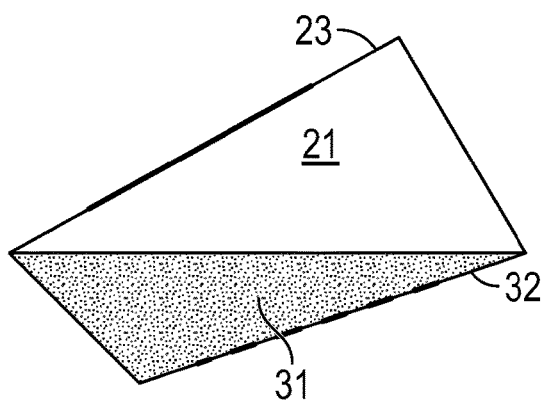
Figure 12C:
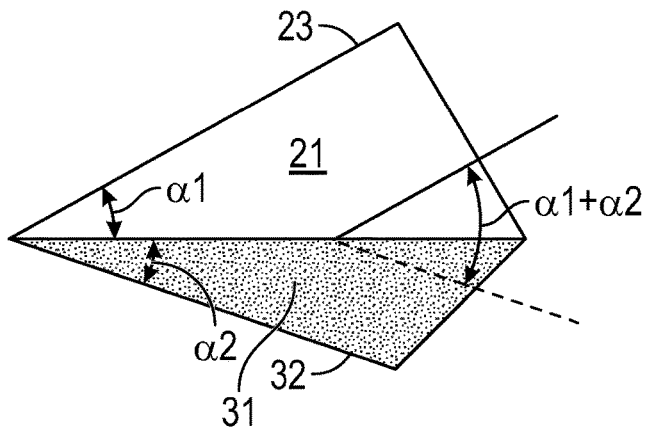

Turning first to FIG. 12A, first prism 21 and second prism 31 have respective first sides/facets 23 and 32 which make an angle W with each other. In some embodiments, angle W may be less than about 90 degrees. That is, angle W is made up of a first angle α1 for first prism 21 and a second angle α2 for second prism 31, as shown in FIG. 12C. In some embodiments, first angle α1 and second angle α2 may be different than each other by at least about 5 degrees.

Figure 12D:
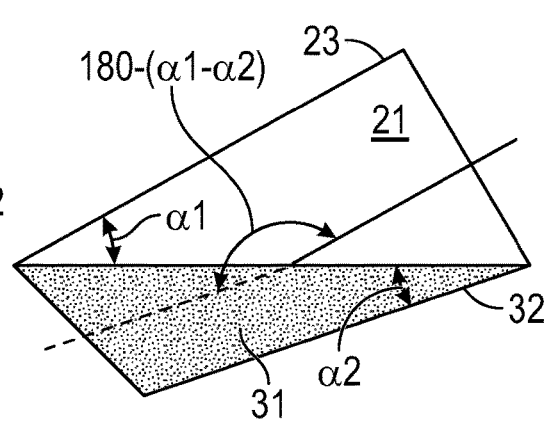

In the embodiments of FIGS. 12A and 12C, first prism 21 and second prism 31 are disposed such that first angle α1 and second angle α2 are facing in the same direction. In other embodiments, such as the embodiments of FIGS. 12B and 12D, first angle α1 and second angle α2 may be facing in opposing directions. In such embodiments, the angle between first sides/facets 23 and 32 can be calculated by the formula 180−(α1−α2), as shown in FIG. 12D.

Figure 13A:
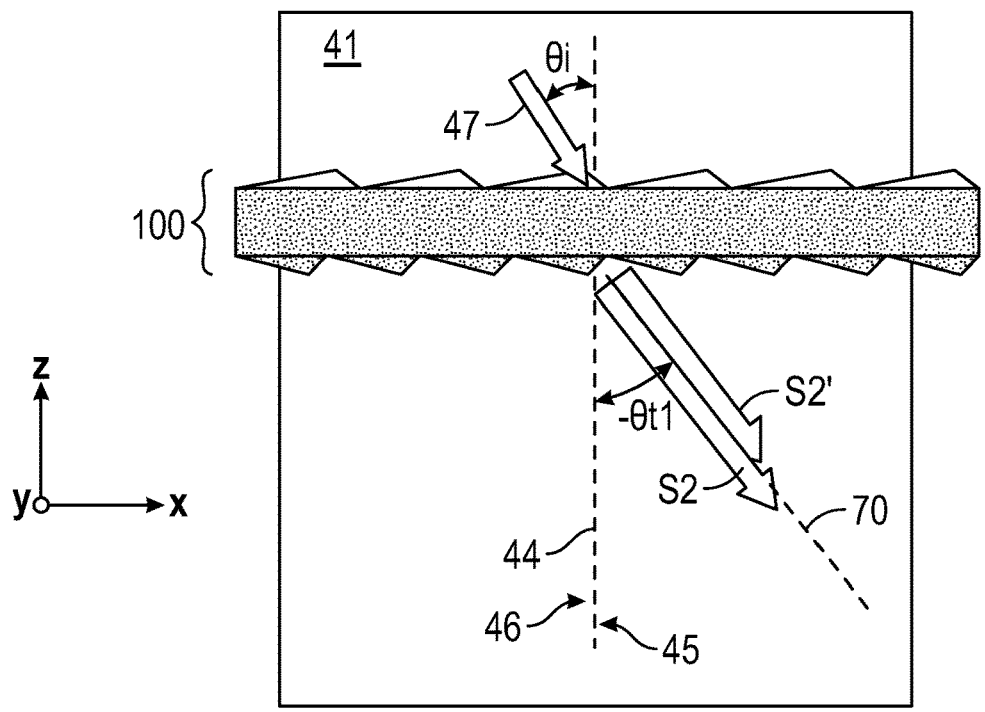
FIGS. 13A-13B show the the transmission percent versus wavelength of an optical construction, in accordance with an alternate embodiment of the present description.
Figure 13B:
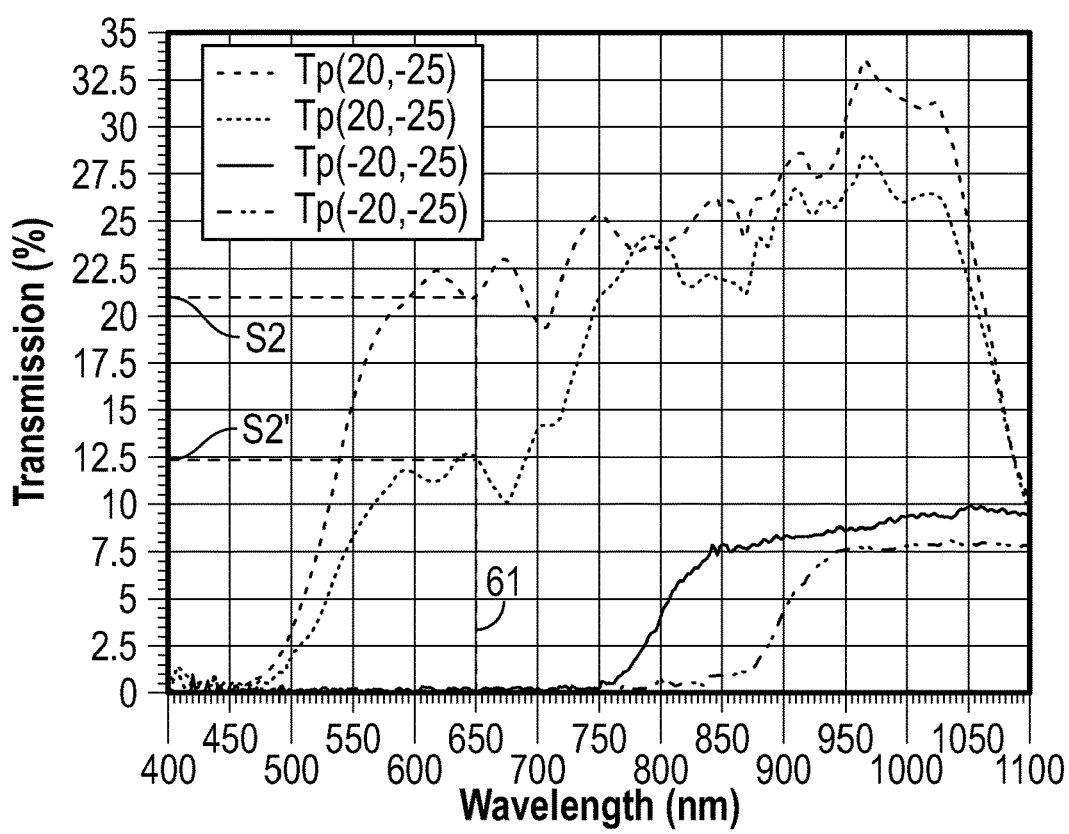

FIGS. 13A and 13B describe an embodiment of optical construction 100 showing incoming light at an oblique angle leading to asymmetric light transmission between different polarization types of light. In some embodiments, for a substantially collimated, incident light beam 47 propagating in an incident plane 41 and incident at an incident location on the optical construction at a first incident angle θi of greater than about 5 degrees, or about 10 degrees, or about 15 degrees, or about 20 degrees, or about 25 degrees, or about 30 degrees, or about 35 degrees, or about 40 degrees, or about 50 degrees, or about 55 degrees, or about 60 degrees which defines a bisecting plane 44 that includes the incident location and is orthogonal to incident plane 41, and for at least a first wavelength (see wavelength 61 in FIG. 13B, e.g., 650 nm) in a first wavelength range extending from about 420 nm to about 1200 nm, and for at least a first polarization state (e.g., p-polarization type), the optical construction may have respective optical transmissions S2 and S2' along a same first transmission direction 70 that makes a first −θt1 angle with bisecting plane 44 and is on an opposite side 45 of bisecting plane 44 relative to a side 46 of incident light 47, such that S2/S2' is greater than or equal to about 1.1, or about 1.2, or about 1.3, or about 1.4, or about 1.5. For example, at first wavelength 61 (650 nm), the transmission percentage of p-polarized light (Tp) with an incoming angle of incidence of +20 degrees and a transmission angle of −25 degrees, S2 is about 20.5%. Also, at first wavelength 61 (650 nm), the transmission percentage of s-polarized light (Ts) with an incoming angle of incidence of +20 degrees and a transmission angle of −25 degrees, S2' is about 12.5%. The ratio of S2/S2' in this example is 20.5/12.5 or about 1.64.

Figure 14:
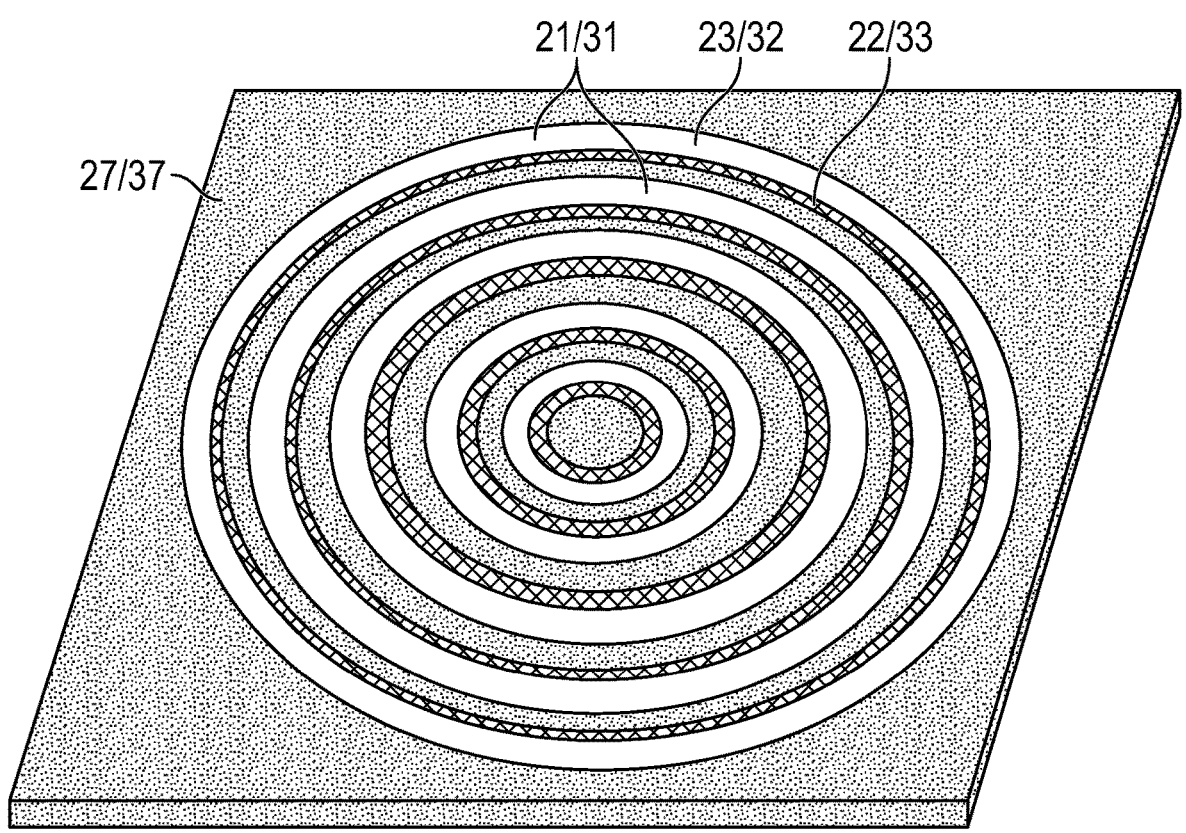
FIG. 14 is a perspective view of an optical film featuring structures in the form of concentric rings, in accordance with an embodiment of the present description.

Finally, FIG. 14 is a perspective view of an embodiment of an optical film featuring structures in the form of concentric rings. Either or both of first 20 and second 30 prismatic films of FIG. 1 may include respective first 27 and second 37 structured surfaces featuring respective first 21 and second 31 pluralities of substantially parallel, substantially linear prisms, as discussed elsewhere herein. In some embodiments, such as the example embodiment of FIG. 14, the first 21 and second 31 pluralities of substantially parallel, substantially linear prisms may be in the form of concentric circles. In such cases, each of the first 21 and second 31 prisms may have opposing first 22, 32 and second 23, 33 sides.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure.

This application is intended to cover any adaptations or variations of the specific embodiments discussed herein. Therefore, it is intended that this disclosure be limited only by the claims and the equivalents thereof.

What is claimed:

1. An optical construction comprising an optical film disposed between, and bonded to, first and second prismatic films, the first and second prismatic films comprising corresponding pluralities of substantially parallel substantially linear first and second prisms extending along a same first direction, each of the first and second prisms comprising opposing first and second sides extending from opposite corresponding first and second ends of a base of the prism and meeting at a peak of the prism, the first and second sides making respective first and second base angles with the base of the prism, the prism peaks of the first and second prismatic films facing away from each other and the optical film,
   such that for a substantially collimated substantially normally incident light, for at least a first wavelength in a first wavelength range extending from about 420 nm to about 1200 nm, and for each of mutually orthogonal in-plane first and second polarization states:
   the optical film has an optical transmission of less than about 1%; and
   the optical construction transmits at least 1% of the incident light as a first transmitted light propagating at an oblique angle of greater than about 5 degrees with respect to a normal to the optical film.

2. The optical construction of claim 1, wherein for light incident at an incident angle of greater than about 30 degrees, for each of the first and second polarization states, and for the at least the first wavelength, the optical film has an optical transmission of less than about 1%.

3. The optical construction of claim 1, wherein the first and second base angles are different from each other by at least about 5 degrees.

4. The optical construction of claim 1, wherein the corresponding pluralities of substantially parallel substantially linear first and second prisms form concentric rings.

5. An optical construction comprising an optical film disposed between, and bonded to, first and second structured films, the first and second structured films comprising respective pluralities of regularly arranged first and second structures comprising respective pluralities of first and second peaks facing away from each other and the optical film,
   such that for a substantially collimated substantially normally incident light beam propagating in an incident plane that is orthogonal to the optical film and defines a bisecting plane that comprises the incident light beam and is orthogonal to the incident plane, and for at least a first wavelength in a first wavelength range extending from about 420 nm to about 1200 nm, the optical construction has:
   optical transmissions T1 and T1' along respective first and second transmission directions that are in the incident plane and on a same first side of the bisecting plane, and make different respective first and second angles with the bisecting plane; and
   optical transmissions T2 and T2' along respective third and fourth transmission directions that are in the incident plane and on a same second, opposite the first, side of the bisecting plane, and make the respective first and second angles with the bisecting plane, T1>T2 and T2'>T1',
   wherein, for a substantially normally incident light having the at least the first wavelength, the optical film has an optical reflectance of greater than about 80% for each of an in-plane first polarization state parallel to the incident plane and an in-plane orthogonal second polarization state parallel to the bisecting plane.

6. The optical construction of claim 5, wherein the first and second structures are first and second prisms extending along a same first direction, each of the first and second prisms comprising opposing first and second sides extending from opposite corresponding first and second ends of a base of the prism and meeting at the peak of the prism, the first and second sides making respective first and second base angles with the base of the prism, the prism peaks of the first and second prismatic films facing away from each other and the optical film.

7. The optical construction of claim 6, wherein the first and second base angles are different from each other by at least about 5 degrees.

* * * * *